United States Patent
Gelfenbeyn et al.

(10) Patent No.: US 11,954,794 B2
(45) Date of Patent: Apr. 9, 2024

(54) RETRIEVAL OF AUGMENTED PARAMETERS FOR ARTIFICIAL INTELLIGENCE-BASED CHARACTERS

(71) Applicant: Theai, Inc., Mountain View, CA (US)

(72) Inventors: Ilya Gelfenbeyn, Palo Alto, CA (US); Mikhail Ermolenko, Mountain View, CA (US); Kylan Gibbs, San Francisco, CA (US)

(73) Assignee: Theai, Inc., Mountain View, CA (US)

( * ) Notice: Subject to any disclaimer, the term of this patent is extended or adjusted under 35 U.S.C. 154(b) by 0 days.

(21) Appl. No.: 18/140,640

(22) Filed: Apr. 28, 2023

(65) Prior Publication Data

US 2023/0351681 A1    Nov. 2, 2023

Related U.S. Application Data

(60) Provisional application No. 63/335,936, filed on Apr. 28, 2022, provisional application No. 63/335,889, filed on Apr. 28, 2022.

(51) Int. Cl.
*G06T 17/00* (2006.01)
*G06F 40/56* (2020.01)
*H04L 51/02* (2022.01)

(52) U.S. Cl.
CPC .............. *G06T 17/00* (2013.01); *G06F 40/56* (2020.01); *H04L 51/02* (2013.01)

(58) Field of Classification Search
None
See application file for complete search history.

(56) References Cited

U.S. PATENT DOCUMENTS

| 2014/0032471 A1 | 1/2014 | Reddy et al. |
| 2015/0172463 A1 | 6/2015 | Quast et al. |

(Continued)

FOREIGN PATENT DOCUMENTS

| WO | 2015016723 A1 | 2/2015 |

OTHER PUBLICATIONS

David Roman; "GPT-3 and DALL-E: AI taking the visual arts industry by storm;" Aug. 18, 2021; WeAreBrain; pp. 1-10; https://wearebrain.com/blog/ai-data-science/gpt-3-dall-e/ (Year: 2021).*

(Continued)

*Primary Examiner* — Peter Hoang
(74) *Attorney, Agent, or Firm* — Georgiy L. Khayet

(57) ABSTRACT

Systems and methods for retrieval of augmented parameters for an artificial intelligence (AI)-based character are provided. An example method includes receiving, from a user via a user interface, at least one keyword describing the AI-based character; retrieving, from at least one data source and based on the at least one keyword, the augmented parameters describing the AI-based character; and generating, based on the augmented parameters, an AI-based character model corresponding to the AI-based character. The at least one data source includes a database configured to store records associated with the AI-based character, an online search service, and a set of clusters associated with a type of a feature of the AI-based character and at least one hidden prompt corresponding to the type of the feature. The type of the feature includes one of the following: a voice, a dialog style, an emotional state, an age, and temperament.

19 Claims, 18 Drawing Sheets

(56) References Cited

U.S. PATENT DOCUMENTS

| | | |
|---|---|---|
| 2015/0186154 A1 | 7/2015 | Brown et al. |
| 2019/0279264 A1* | 9/2019 | Gelfenbeyn et al. |
| 2021/0358188 A1* | 11/2021 | Lebaredian ............. G06T 13/00 |
| 2023/0274124 A1* | 8/2023 | Moser .................... G06N 20/00 |
| | | 706/11 |

OTHER PUBLICATIONS

Andres Garzon; "What is DALL-E? And What Does it Mean for AI?" Feb. 10, 2021; Jobsity; pp. 1-11; https://www.jobsity.com/blog/what-is-dall-e-and-what-does-it-mean-for-ai (Year: 2021).*

Zhang, Han, et al. "Stackgan: Text to photo-realistic image synthesis with stacked generative adversarial networks." Proceedings of the IEEE international conference on computer vision. 2017. (Year: 2017).*

Pataranutaporn, P., Danry, V., Leong, J et al. AI-generated characters for supporting personalized learning and well-being. Dec. 15, 2021; Nat Mach Intell 3, 1013-1022. https://doi.org/10.1038/s42256-021-00417-9 (Year: 2021).*

* cited by examiner

| Possible User Inputs 702 | Input Impact for Goals Model 704 |
|---|---|
| AI Character Personality and Background Description 706 | Allow Constitution of AI Character Personality and Style, Which Biases the Reason for Which, and Manner in Which, the AI Characters Pursue Goals 708 |
| Motivations 710 | Structure Top-Level Motivations That Underlie the Reasoning for AI Character Behavior and Directions 712 |
| Flaws and Challenges 714 | Allow establishment of flaws and challenges, which may influence, motivate, or hinder goal enactment by an AI character 716 |
| Identity Profile 718 | Specify elements of an AI character (e.g., role, interests) which may have an influence on how the AI character pursues goals (e.g., a policeman trying to uncover information differently from a salesperson) 720 |
| Emotional Profile 722 | Establish an emotional profile of an AI character, such that it may influence expression of goals (e.g., more introverted character may be nervous if having to try and sell something) 724 |
| Personal Memory 726 | Provide an AI character with personal memories that may be brought up during the pursuit of a goal (e.g., if an AI character previously got bit by a dog and has to tie up a dog, the AI character may express fear or angst) 728 |
| World Knowledge 730 | Integrate information about the world to contextualize goal pursuit (e.g., the AI character may know that the police are corrupt in an area, and when pursuing an investigation show more caution) 732 |
| Contextual Knowledge 734 | Include information about an environment or context to contextualize goal pursuit (e.g., if a volcano just exploded and the character is asked to carry a girl to safety, the AI character may show more hurriedness) 736 |
| Voice Configuration 738 | Configuration of voice in real-time can allow AI characters to show different expressions during a goal (e.g., if an AI character is saving someone, the voice may be loud and forceful) 740 |
| Dialogue Style Controls 742 | Dialogue style influences the manner and style of speech (e.g., a Wild West bartender may still use slang when selling a drink) 744 |
| Goals and Actions 746 | Specify the goals that an AI character has per scene, and then set up the actions the AI character has available to pursue the goal 748 |
| Animation Triggers and Controls 750 | Determine which actual physical movements the AI character can take to pursue the goal (e.g., take an item off the shelf and show the player when selling) 752 |

RETRIEVAL OF AUGMENTED PARAMETERS FOR ARTIFICIAL INTELLIGENCE-BASED CHARACTERS

CROSS-REFERENCE TO RELATED APPLICATIONS

The present application claims priority of U.S. Provisional Patent Application No. 63/335,936 filed on Apr. 28, 2022, entitled "KEYWORD MATCHING BASED GENERATION OF AUGMENTED DESCRIPTIONS FOR ARTIFICIAL INTELLIGENCE CHARACTER MODELS," and U.S. Provisional Patent Application No. 63/335,889 filed on Apr. 28, 2022, entitled "MEMORY RETRIEVAL IN ARTIFICIAL INTELLIGENCE CHARACTER MODELS." The subject matter of aforementioned applications is incorporated herein by reference in its entirety for all purposes.

TECHNICAL FIELD

This disclosure generally relates to artificial intelligence (AI)-based character models. More particularly, this disclosure relates to retrieval of augmented parameters for generation of AI-based character models corresponding to AI-based characters.

BACKGROUND

Virtual characters are widely used in software applications, such as games, metaverses, social media, messengers, video communication tools, and online training tools. Some of these applications allow users to interact with virtual characters. However, existing models of virtual characters are typically developed for specific applications and do not allow integration with other applications and environments. Moreover, existing virtual character models are typically based on descriptions of specific rules and follow specific logic.

This approach results in virtual character models that lack the ability to build their conversations with users based on a dynamically changing contextual environment of the conversation. The context of the conversation between the users and the virtual characters can change overtime due to various environmental factors, for example, based on changes in emotions of the users or virtual characters expressed during conversation or occurrence of various events in the virtual environment where the interactions take place. Conventional virtual character models typically maintain constant parameters for the duration of the entire conversation, thereby making it difficult to dynamically adjust the conversation based on the changing context.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one example embodiment, a system for retrieval of augmented parameters for an AI-based character is provided. The system may include a processor and a memory storing instructions to be executed by the processor. The processor may be configured to receive, from a user via a user interface, at least one keyword describing the AI-based character. The processor may be further configured to retrieve, from at least one data source and based on the at least one keyword, augmented parameters describing the AI-based character. The processor may be further configured to generate, based on the augmented parameters, an AI-based character model corresponding to the AI-based character. The system may be implemented as a computing device.

In another example embodiment, a method for retrieval of augmented parameters for an AI-based character is provided. The method may commence with receiving, from a user via a user interface, at least one keyword describing the AI-based character. The method may proceed with retrieving, from at least one data source and based on the at least one keyword, the augmented parameters describing the AI-based character. The method may further include generating, based on the augmented parameters, an AI-based character model corresponding to the AI-based character.

According to another example embodiment, provided is a non-transitory computer-readable storage medium having instructions stored thereon, which, when executed by one or more processors, cause the one or more processors to perform steps of the method for retrieval of augmented parameters for an AI-based character.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 7A shows an architecture diagram illustrating AI character models with goal oriented behavior, according to an example embodiment.

DETAILED DESCRIPTION

Figure 1:
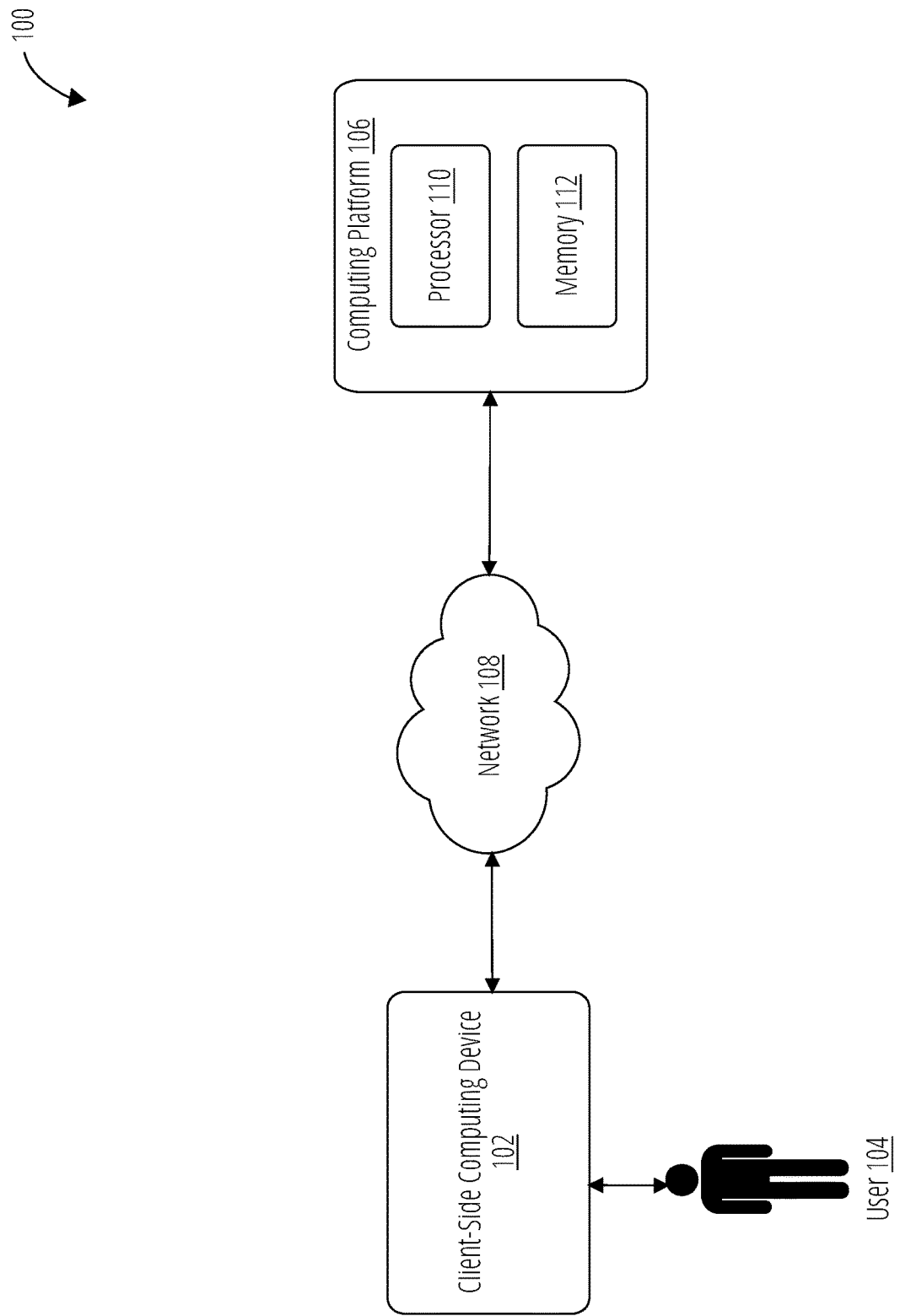
FIG. 1 illustrates an environment within which methods and systems for retrieval of augmented parameters for an AI-based character can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

Embodiments of the present disclosure are directed to a platform for generating AI character models. In one example embodiment, the platform may receive a description of an AI character and generate an AI character model capable of interacting with users verbally and through emotions, gestures, actions, and movements. The description can be provided using a natural language describing a role, motivation, environment, and other parameters associated with the AI character. The platform may utilize common knowledge to train the AI character model in order to interact with the users. The AI character model may evolve its characteristics, change emotions, and acquire knowledge based on conversations with the users.

The AI character model may utilize a LLM in conversations with users. In order to obtain more effective and appropriate responses to questions and messages received from the users, the platform may apply various restrictions, classification, shortcuts, and filters in response to the questions and messages of the users to form appropriate requests to the LLMs. These targeted requests to the LLMs may result in optimized performance of the platform in view of obtaining more effective and appropriate responses to questions and messages of the users. For example, prior to sending a request to the LLM, the platform may classify and filter questions and messages of a user to change words based on the personalities of AI characters, emotional states of AI characters, emotional states of users, context of a conversation, a scene and environment of the conversation, and so forth. Similarly, the platform may adjust the response formed by the LLM by changing words and adding fillers based on the personality, role, and emotional state of the AI character. In an example embodiment, a filler may include a sound, word, or phrase (such as "you know?") used to fill pauses in speaking. The AI character model may change emotions based on the role of the AI character and in response to the emotions of the user.

The platform may include integration interfaces, such as application programming interfaces (APIs), allowing external applications to use the AI character model. The AI character models generated by the platform can be used in game applications, virtual events and conversations, corporate training, and so forth.

Some embodiments of the present disclosure relate to a system and a method for retrieval of augmented parameters for an AI-based character. The system and the method may be integrated into the platform for generating AI character models. The system and method may allow using initial user descriptions of AI characters and/or user interactions with the AI characters to retrieve additional information associated with the AI characters. The additional information can be used to determine augmented descriptions of the AI characters and generate, based on the augmented description, AI-based character models corresponding to the AI-based characters.

In some embodiments, a user may use a user interface to enter a description of an AI character. The description may include one or more keywords. The system of the present disclosure may use the keywords provided by the user to retrieve additional information from one or more data sources. The additional information may be associated with the AI character and/or the user. The data sources may include external data sources acting as external knowledge sources, such as web resources (for example, online search services). The data sources may include one or more databases configured to store records associated with AI characters and AI character models that generate the AI characters. Based on the retrieved additional information, information related to the AI character may be augmented. The system may generate, based on the augmented information, augmented parameters for generation of an AI-based character model corresponding to the AI-based character. The retrieval of augmented parameters for the AI-based character may improve the quality of the AI-based character model corresponding to the AI character. Specifically, the behavior of the AI-based character model may be augmented in real time based on real-time augmentation of information associated with the AI character.

The retrieval of augmented parameters can be carried out as before generating the AI-based character model as well as after the AI-based character model has been generated. For example, additional parameters can be retrieved during interaction of the AI-based character model with the user. Then the system may update, based on the additional parameters, the AI-based character model in real-time during the interaction with the user.

In some embodiments, information concerning the AI-based character model, memories associated with the AI-based character model, facts associated with the AI-based character model, and the like may be stored in a database. During interaction of the AI-based character model and the user, the information may be retrieved from the database. The information can be used to generate a response of the AI-based character model to the user. In certain embodiments, the information retrieved from the database can also be used to generate a request to a generative language model (GLM). The GLM may generate, based on the request, the response for the user. The response received from the GLM can also be used to generate additional parameters associated with the AI character corresponding to the AI-based character model. Then the system may update, based on the additional parameters, the AI-based character model in real-time during the interaction with the user.

Referring now to the drawings, FIG. 1 illustrates an environment 100 within which methods and systems for retrieval of augmented parameters for an AI-based character can be implemented. The environment 100 may include a client-side computing device 102 associated with a user 104, a computing platform 106 for providing an AI character model (also referred to herein as a computing platform 106), and a data network shown as a network 108. The computing platform 106 and client-side computing device 102 (also referred to herein as a client) may communicate via the network 108.

The client-side computing device 102 may include, but is not limited to, a smartphone, a laptop, a personal computer, a desktop computer, a tablet computer, a phablet, a personal digital assistant, a mobile telephone, a smart television set, a personal computing device, and the like. The computing platform 106 may include a processor 110 and a memory 112 storing instructions to be executed by the processor 110.

The network 108 can refer to any wired, wireless, or optical networks including, for example, the Internet, intranet, a Local Area Network (LAN), a Personal Area Network, Wide Area Network (WAN), a Virtual Private Network, a Wi-Fi® network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the network 108 may include a corporate network, a data center network, a service provider network, a mobile operator network, or any combinations thereof.

Figure 2:
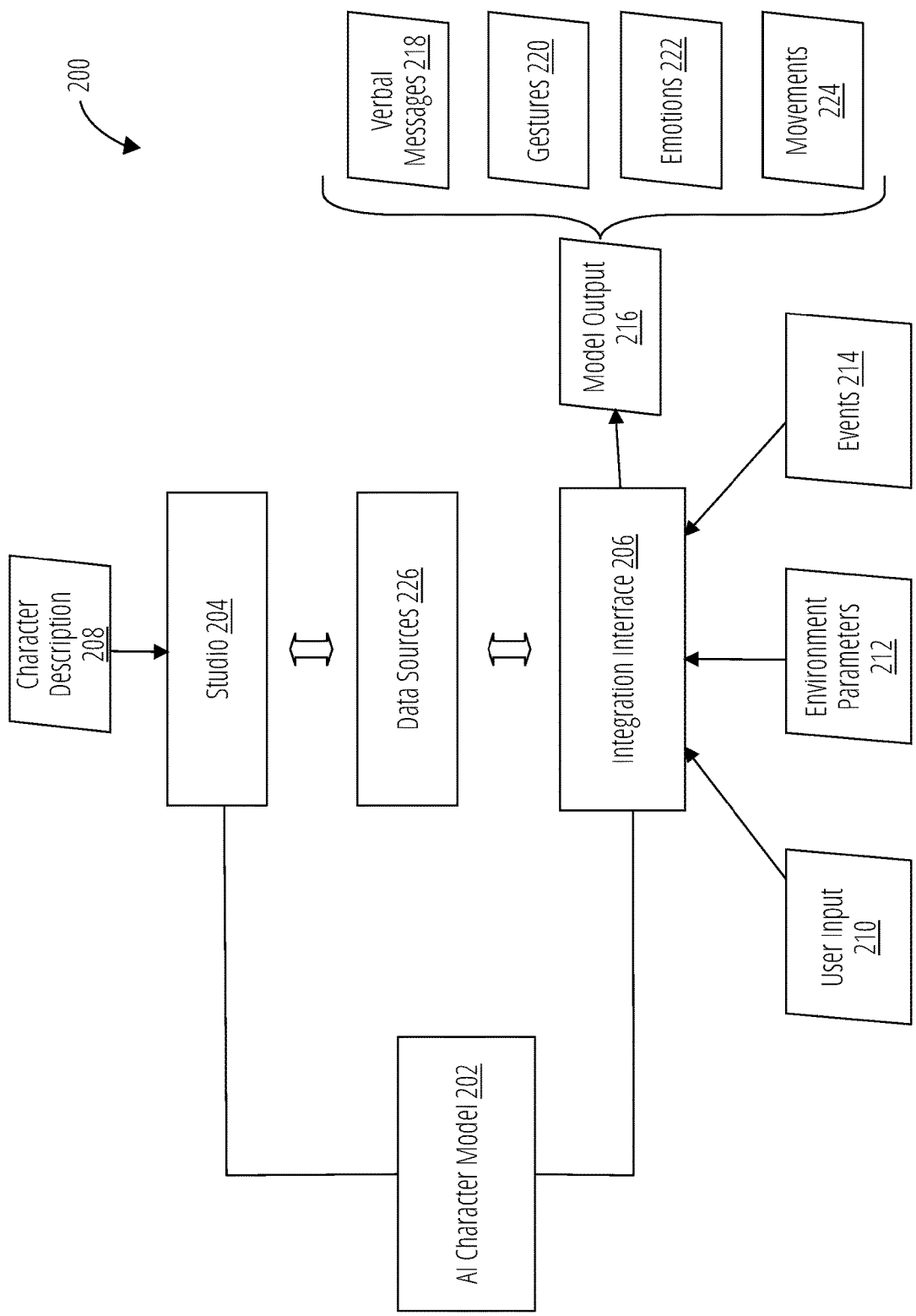
FIG. 2 is a block diagram illustrating a platform for generating an AI character model, according to an example embodiment.

The computing platform 106 may be associated with an AI character model (shown in detail in FIG. 2). The AI character model may be configured to generate AI-based characters, also referred herein to as AI characters. The user 104 may use computing platform 106 to create the AI character models and interact with the AI character models via the client-side computing device 102 in a virtual environment associated with the AI character. The virtual environment can be generated by the client-side computing device 102 for presenting to the user 104. The computing platform 106 is shown in detail in FIG. 2 as a platform 200.

FIG. 2 illustrates a platform 200 for generating AI character models, according to an example embodiment. The platform 200 may include a studio 204, an integration interface 206, and an AI character model 202. AI character models are also referred to herein as AI-based character models. The studio 204 and the integration interface 206 may be in communication with data sources 226. The data sources 226 may include online search services. The data sources 226 may include a set of clusters each associated with a type of a feature of an AI character.

In one example embodiment, the studio 204 may receive, via a user interface, a character description 208 of an AI character. The studio 204 may generate, based on the character description 208, an AI character model 202 corresponding to the AI character. An AI character is also referred to herein as an AI-based character.

The character description 208 can be provided using a natural human language. The character description may include a description of an AI character similar to a description of a character to be played that can be provided to a real actor. The user interface of the studio 204 may include input fields allowing a developer to enter different aspects (i.e., parameters) of the AI character. Each input field may define a part of the brain of the AI character.

The input fields may include a text field for entering a core description of the AI character. An example core description can include "Buddy is a kind young man from Argentina." The input fields may include a text field for entering a motivation of the AI character. An example motivation may include "Buddy likes to dance."

The input fields may also include a text field for entering common knowledge and facts that the AI character may possess. For example, the field for common knowledge may include "orcs from Mordor; orcs like to eat hobbits."

The input fields may include fields for selecting an avatar and voice of the AI character. The input fields may include fields for defining memory and personality features of the AI character. The input fields may also include a text field describing the scene and environment in which the AI character is placed. For example, the text field for the scene may include "savanna," "city," "forest," "bar," and so forth.

The integration interface 206 may receive a user input 210, environment parameters 212, and events 214 and generate, based on the AI character model 202, a model output 216.

The user input 210 may include voice messages of a user. The voice messages may include phrases commonly used in conversions. The integration interface 206 may generate, based on the voice messages, requests and provide the request to the AI character model 202 to generate the model output 216. In an example embodiment, the requests may include text messages verbalized by the user and an emotional state of the user.

The model output 216 may include verbal messages 218, gestures 220, emotions 222, and movements 224. The verbal messages 218 may include responses to the voice messages of the user. The gestures 220 may include specific hand and facial movements of the AI character, either accompanying the verbal messages 218 or occurring without the verbal messages 218. Gestures may include, for example, waving goodbye, nodding to indicate agreement, or pointing to indicate a direction. Gestures are typically intentional and have a specific meaning understood by those familiar with the culture or context in which they are used. Emotions 222 may include intonations of the voice of the AI character while uttering the verbal messages 218 or facial expressions of the AI character. Movements 224 may refer to the overall movements and postures of the body of the AI character, including the position of the arms, legs, and torso. The movements 224 can be used to convey a range of emotions and attitudes, such as confidence, relaxation, or nervousness. Movements 224 can be both intentional and unintentional.

Figure 3:
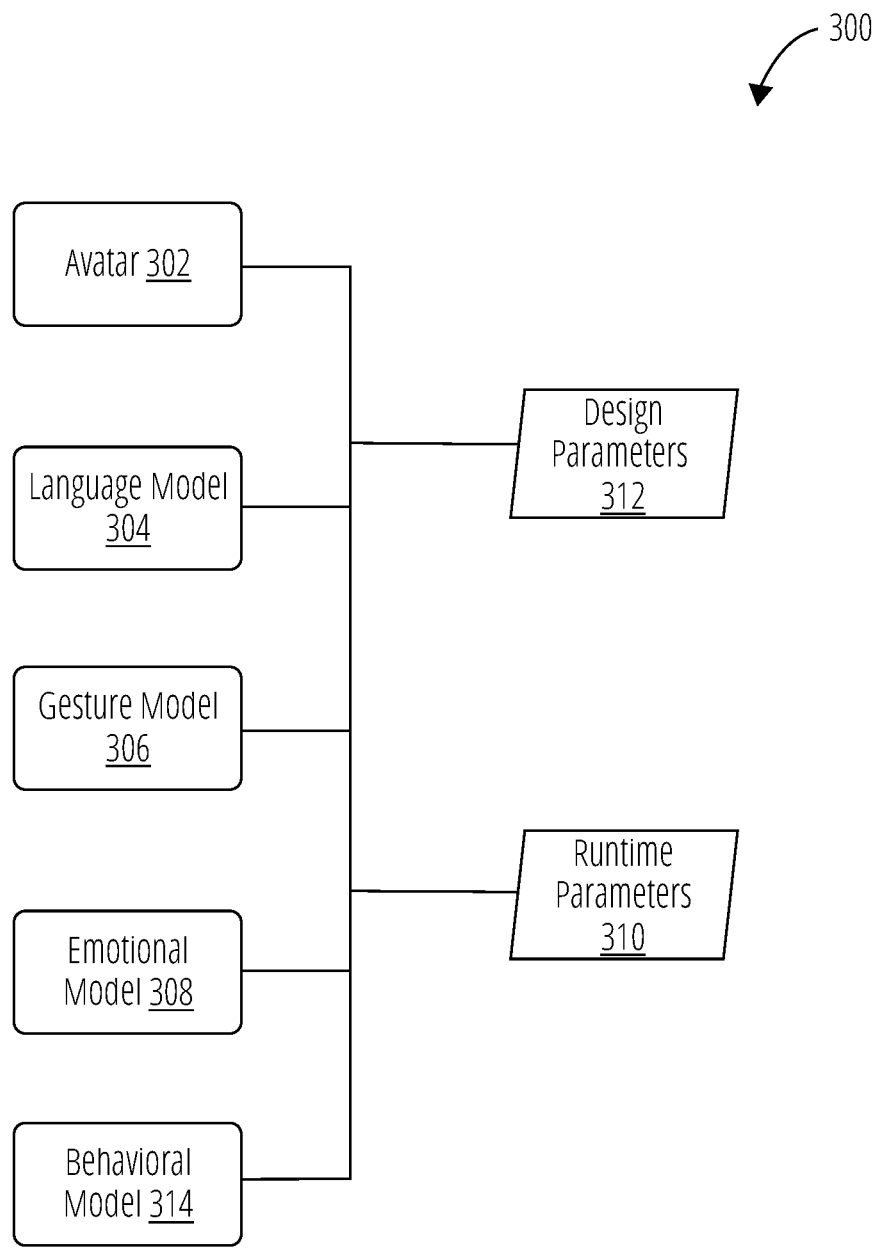
FIG. 3 provides additional details for an AI character model, in accordance with an example embodiment.

FIG. 3 provides additional details of an AI character model 300, in accordance with an example embodiment. The AI character model 300 may include a set of models including an avatar 302, a language model 304, a gesture model 306, an emotional model 308, a behavioral model 314, and the like. The models may include machine learning models. In some embodiments, the models can be implemented as artificial neural networks. The AI character model 300 can include runtime parameters 310 and design parameters 312.

The design parameters 312 may correspond to settings for personality and general emotions of an AI character. The design parameters 312 can be generated based on character description 208 received via the studio 204 shown in FIG. 2.

The runtime parameters 310 may correspond to an emotional state of an AI character. The emotional state can be changed based on conversations with the user, elements in the scene, the surrounding environment in which the AI character is currently present, and so forth.

The avatar 302 may include a three-dimensional body model rendering the AI character. In some embodiments, the avatar 302 can be created using applications currently available on the market.

The language model 304 can be based on an LLM. The LLM is a machine learning algorithm that can recognize, predict, and generate human languages on the basis of very large text-based data sets. The language model 304 may form a request for the LLM, receive a response from the LLM, and process the response from the LLM to form a response to voice messages of the user. The request for the LLM can include classification and adjustment of the text requests from the integration interface 206, according to the current scene, environmental parameters, an emotional state of the AI character, an emotional state of the user, and current context of the conversion with the user. Processing of the response from the LLM may include filtering of the response to exclude unwanted words, verifying relevancy of the response, changing the words in the response, and adding fillers to phrases according to the personality of AI characters. In other embodiments, the language model 304 may also retrieve data from available sources, such as Wikipedia® or Game Wikipedia®, to generate the response.

The gesture model 306 may generate a movement of the body of the AI character based on the response to the user, an emotional state of the AI character, and current scene parameters. For example, the AI character may turn to the user and raise a hand in response to a greeting from the user. The greeting gestures can differ based on scenes and environments.

The emotional model 308 may track the emotional state of the AI character based on the context of the conversation with the user, an emotional state of the user, a scene and environmental parameters, and so forth.

The behavioral model 314 may track and change behavioral characteristics of the AI character as a result of conversations with users or changes in the environment and scenes during a predetermined time period.

In general, the LLM can statistically suggest a continuation to any input provided to the LLM. If a conversation is started by using the LLM, the LLM may propose the next step for the conversation. For example, if a conversation includes a story related to some topic, the LLM may propose the next line for the story.

One of the key characteristics of LLMs is the fact that LLMs are large. In particular, the LLMs are trained on vast amounts of data. When used in conversations, the LLMs can statistically suggest some text determined by the LLMs to be meaningful in the next step of the conversation. Therefore, the LLMs conventionally build the conversation based on the text itself.

Figure 4:
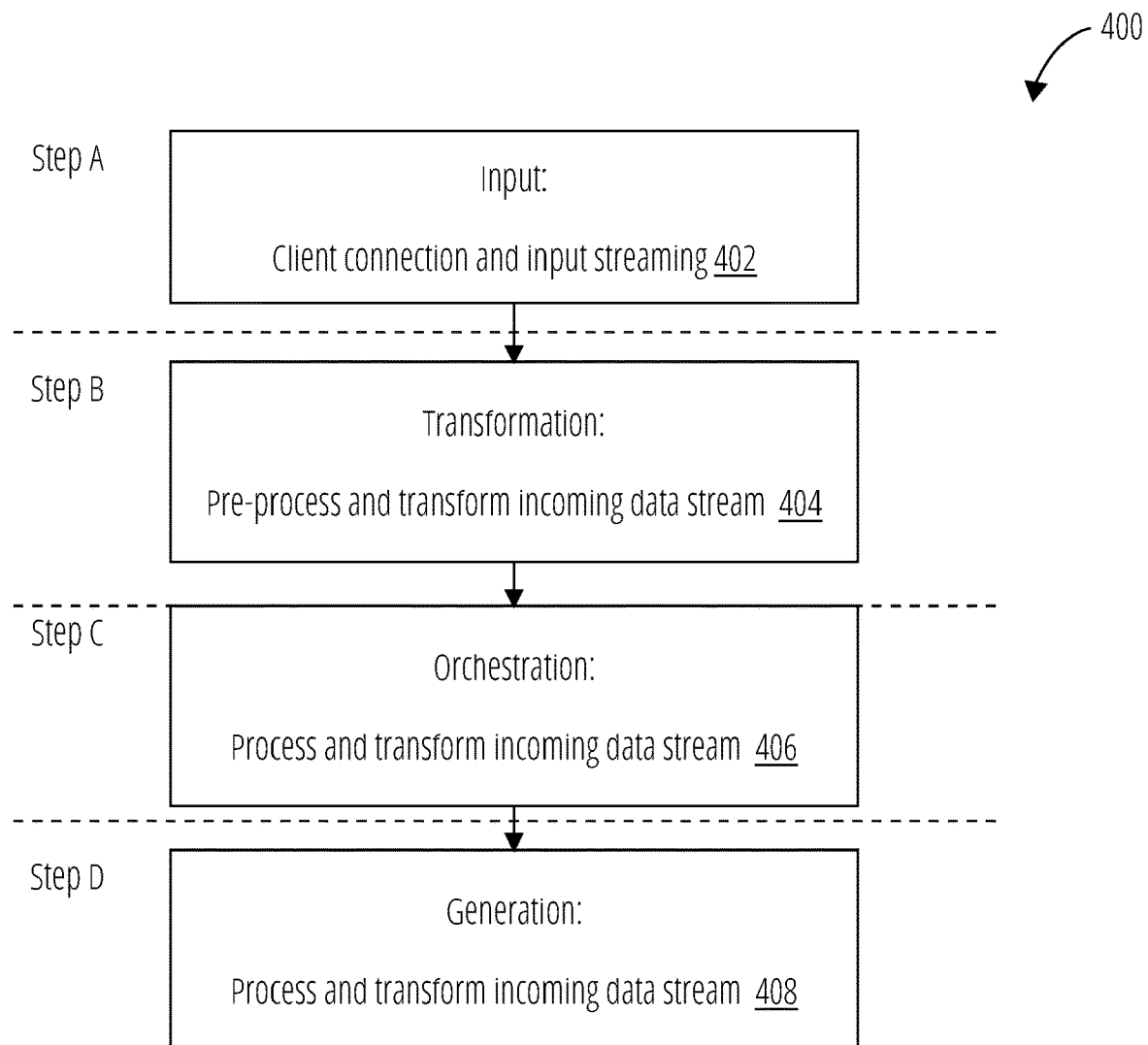
FIG. 4 is an architecture diagram that shows using a surrounding architecture of an AI character model to control an output and behavior generated by large language models (LLMs), according to an example embodiment.

FIG. 4 is an architecture diagram 400 that shows using a surrounding architecture of an AI character model to control an output and behavior generated by LLMs, according to an example embodiment. The main steps implemented to control the output and behavior of AI characters using the AI character model include an input step 402 (step A), a transformation step 404 (step B), an orchestration step 406 (step C), and a generation step 408 (step D). The input step 402 includes providing a connection with a client and performing input streaming. The transformation step 404 includes pre-processing and transforming an incoming data stream. The orchestration step 406 and the generation step 408 include processing and transforming an incoming data stream. Steps A-D are shown in detail in FIG. 5, FIG. 6A, and FIG. 6B.

Figure 5:
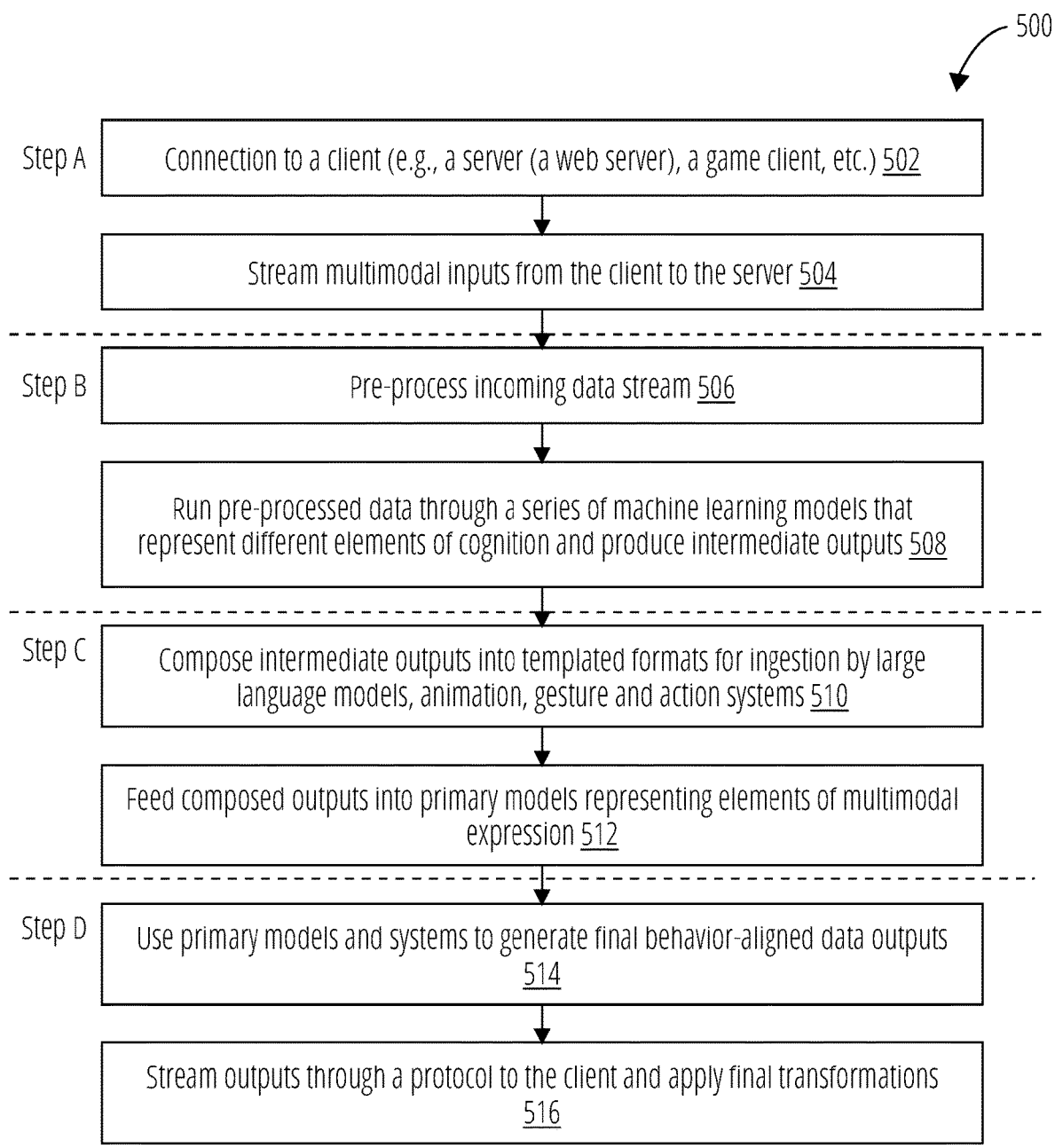
FIG. 5 is a detailed architecture diagram showing a surrounding architecture of an AI character model, according to an example embodiment.

FIG. 5 is a detailed architecture diagram 500 showing a surrounding architecture of an AI character model, according to an example embodiment. The input step (step A) may include establishing a connection between a client and a server, as shown in block 502. In an example embodiment, the client may include a user device associated with a user. The user may use the client device to interact with AI characters in a virtual environment using an application running on the user device. To establish the connection between the system of the present disclosure and the client, a server (e.g., a web server), a game client, and an application running on the user device may be provided. The server, the game client, and the application may be set up based on predetermined rules to enable streaming multimodal inputs from the client to the server, as shown in block 504. The inputs are shown in detail in FIG. 6A.

Figure 6A:
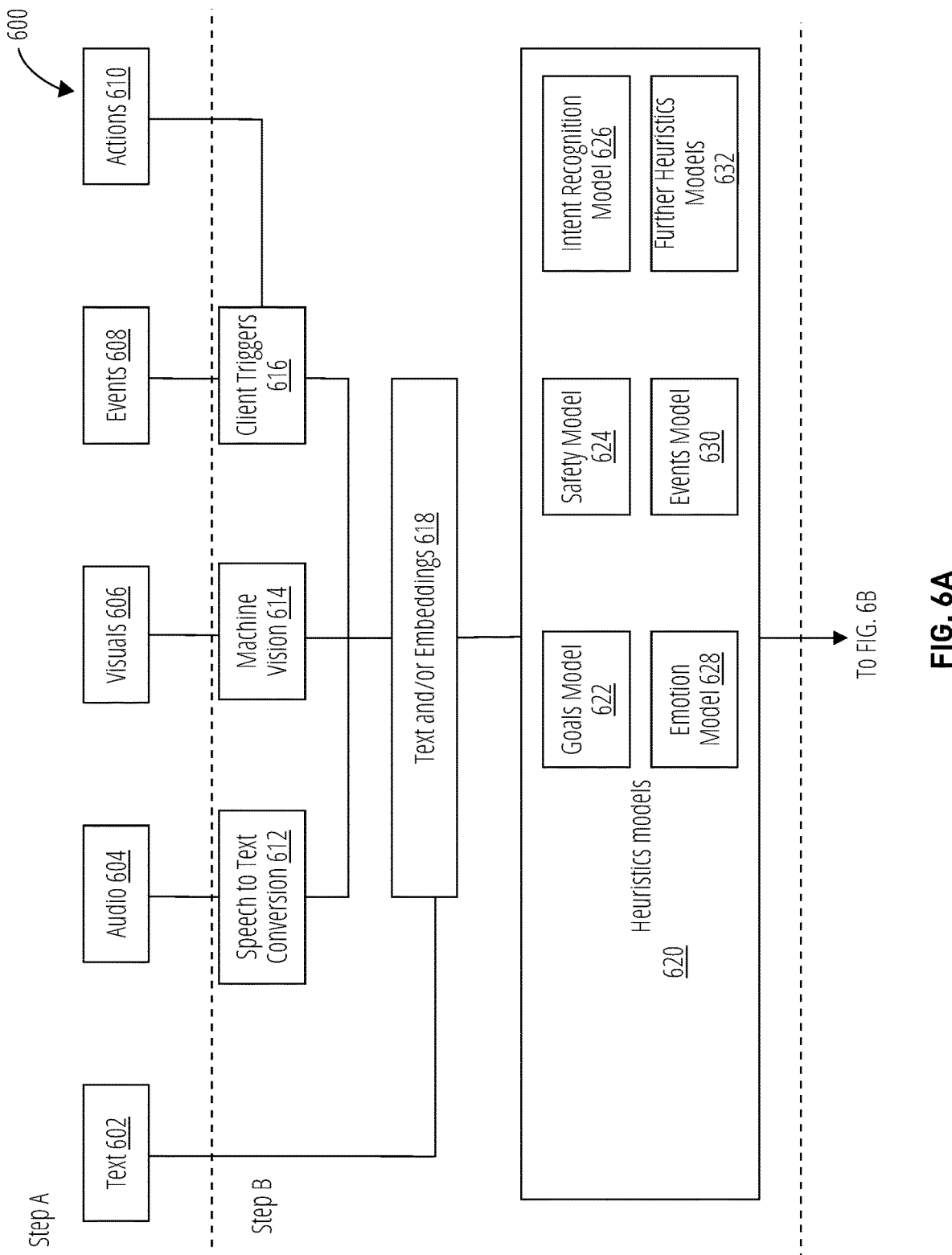
FIG. 6A is a detailed architecture diagram showing a surrounding architecture of an AI character model, according to an example embodiment.
Figure 6B:
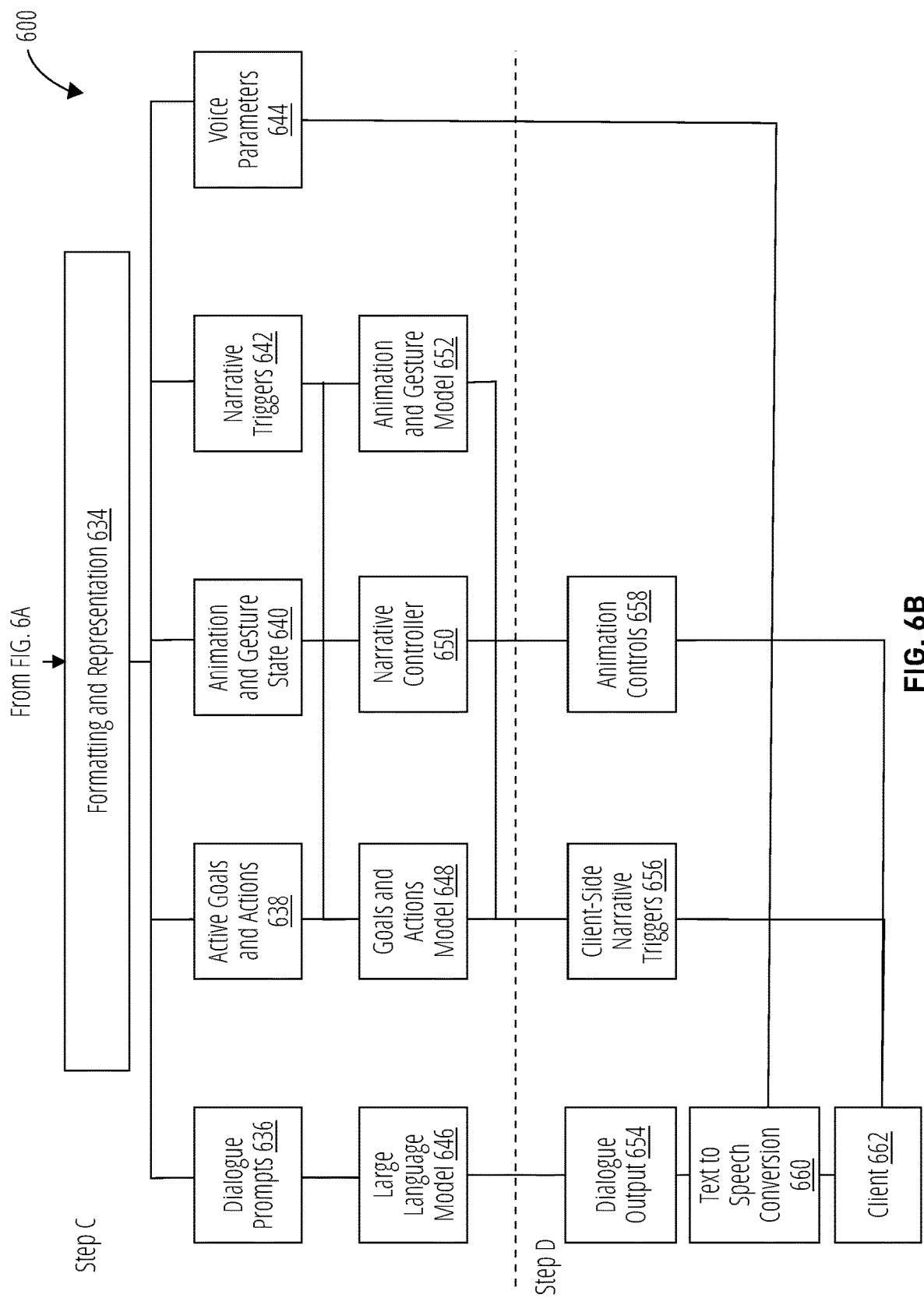
FIG. 6B is a detailed architecture diagram showing a surrounding architecture of an AI character model, according to an example embodiment.

FIG. 6A and FIG. 6B show a detailed architecture diagram 600 that illustrates a surrounding architecture of an AI character model, according to an example embodiment. The connection established between the client and the server via predetermined protocols enables collecting a plurality of streams of inputs from the client. Each stream may be associated with one of multiple modalities. In an example embodiment, the modality may include a type of data. As shown in FIG. 6A, the inputs collected from the client may include text 602, audio 604, visuals 606, events 608, actions 610, gestures (not shown), and so forth.

Referring again to FIG. 5, the transformation step (step B) may include pre-processing the incoming streams of data in block 506. The streams of inputs may be pre-processed differentially based on the specific modality. The pre-processing may include converting the received inputs into a singular format. The pre-processing is shown in detail in FIG. 6A.

As shown in FIG. 6A, the text 602 is in the form of a natural language and may need no pre-processing. The audio 604 may be pre-processed using a speech to text conversion 612, in the course of which the audio input may be transformed into text. The visuals 606 may be pre-processed using a machine vision 614 based on object classification, environment understanding, and so forth.

The events 608 may include any event received from the client. An example event may include a button click in a game, an AI character moving a sword in a game, a button click in a web application, and so forth. The actions 610 may be received from an environment of AI characters with which the user interacts. An example action may include reacting to a horse riding by in an application, calling a web hook to retrieve information, and so forth. The events 608 and the actions 610 may be processed into client triggers 616. Based on the pre-processing, all inputs may be transformed into text and/or embeddings 618. The embeddings (also referred to as word embeddings) are word representations, in which words with similar meaning have a similar representation. Thus, a pre-processed data stream in the form of text and/or embeddings 618 may be obtained upon pre-processing of the received inputs.

Referring again to FIG. 5, the transformation step (step B) may further include running the pre-processed data through a series of machine learning models that represent different elements of cognition and producing intermediate outputs, as shown in block 508. Processing the data using the series of machine learning models is shown in detail in FIG. 6A.

As shown in FIG. 6A, the text and/or embeddings 618 may be passed through a plurality of machine learning models shown as heuristics models 620. The processing of the text and/or embeddings 618 using the heuristics models 620 may include passing the text and/or embeddings 618 through a goals model 622, a safety model 624, an intent recognition model 626, an emotion model 628, an events model 630, and a plurality of further heuristics models 632.

The goals model 622 may be configured to process the text and/or embeddings 618 and recognize, based on what was said by the user or the AI character, what goals need to be activated. The safety model 624 may be configured to process the text and/or embeddings 618 and filter out unsafe responses. The intent recognition model 626 may be configured to process the text and/or embeddings 618 and determine what a player (i.e., a user) intends to do and use an intent to trigger one or more events at a later point of interaction of the player with AI characters in the game.

The emotion model 628 may be configured to process the text and/or embeddings 618 and update, based on what the player said, the emotions of the AI character. The events model 630 may be configured to process the text and/or embeddings 618 and determine the events. The events may act as triggers for performing an action based on predetermined rules. For example, a predetermined rule may include a rule according to which when the player steps into a specific location (the event) near the AI character, the AI character takes a predetermined action.

Upon the processing of the data, the heuristics models 620 may provide intermediate outputs. Each of the intermediate outputs provided by the heuristics models 620 may be a differential element. Specifically, the goals model 622, the safety model 624, the intent recognition model 626, the emotion model 628, and the events model 630 may each provide a specific sort of a separate element. The separate elements need to be orchestrated by composing together into a specific templated format.

Referring again to FIG. 5, the orchestration step (step C) may include composing the intermediate outputs received from the heuristics models into templated formats for ingestion by LLMs and animation, gesture, and action models in block 510. Upon composing the intermediate outputs into a template, the composed outputs may be fed into primary models representing elements of multimodal expression, as shown in block 512. The orchestration step (step C) is further shown in detail in FIG. 6B.

As shown in FIG. 6B, the orchestration step (step C) may include formatting and representation 634 of the intermediate outputs received from the heuristics models. Upon being formatted, the composed data may be sent to another series of AI models. Specifically, the composed data received in block 510 shown in FIG. 5 may include dialogue prompts 636, active goals and actions 638 (i.e., what goals and actions need to be active based on what was said or done by the user or the AI character), animation and gesture state 640 (i.e., what gestures or animations need to be active depending on the emotional state and the goal), narrative triggers 642, voice parameters 644, and so forth. The dialogue prompts 636 may be provided to a LLM 646. The active goals and actions 638 may be provided to a goals and actions model 648, the narrative controller 650, and the animation and gesture model 652. The animation and gesture state 640 may be provided to the goals and actions model 648, the narrative controller 650, and the animation and gesture model 652.

The narrative triggers 642 may be provided to the goals and actions model 648, the narrative controller 650, and the animation and gesture model 652. An example of the narrative triggers 642 may include words "I want to be in the investigation" said by the player. The goals and actions model 648, the narrative controller 650, and/or the animation and gesture model 652 may receive this narrative trigger and change the storyline and progress forward in the game.

The voice parameters 644 may be used for enacting the voice in the virtual environment. For example, if the AI character is angry, the voice parameter "angry" may be used to change the voice of the AI character in the game. If the state of the AI character changes to very forceful, the state can be shown by changing the voice of the AI character.

Referring again to FIG. 5, the generation step (step D) may include using primary models and systems to generate final behavior-aligned data outputs in block 514. The generation step (step D) may further include streaming outputs through predetermined protocols to the client and applying final transformations in block 516. The generation step (step D) is further shown in detail in FIG. 6B.

As shown in FIG. 6B, the LLM 646 is a model used to generate a dialogue output 654. The goals and actions model 648 and the narrative controller 650 both decide what needs to be sent to the client side. The client side may be represented by a client engine, a game engine, a web application running on a client-side computing device, and the like. The goals and actions model 648 and the narrative controller 650 may decide what needs to be enacted on the client side. The animation and gesture model 652 may decide what animations or gestures need to be activated on the client side to enact the behavior of AI characters. Therefore, the goals and actions model 648, the narrative controller 650, and the animation and gesture model 652 provide client-side narrative triggers 656 and animation controls 658. The dialogue output 654, the client-side narrative triggers 656, and the animation controls 658 provide the dialogue, the events, the client-side triggers, and the animations that need to be enacted on the client side.

The dialogue output 654, the client-side narrative triggers 656, the animation controls 658, and the voice parameters 644 may be processed using text to speech conversion 660. The output data obtained upon applying the text to speech conversion 660 are sent as a stream to the client 662. The game engine animates the AI character based on the received data to provide the generative behavior of the AI character. The animating may include, for example, instructing the AI character on what to say, how to move, what to enact, and the like.

Figure 7B:
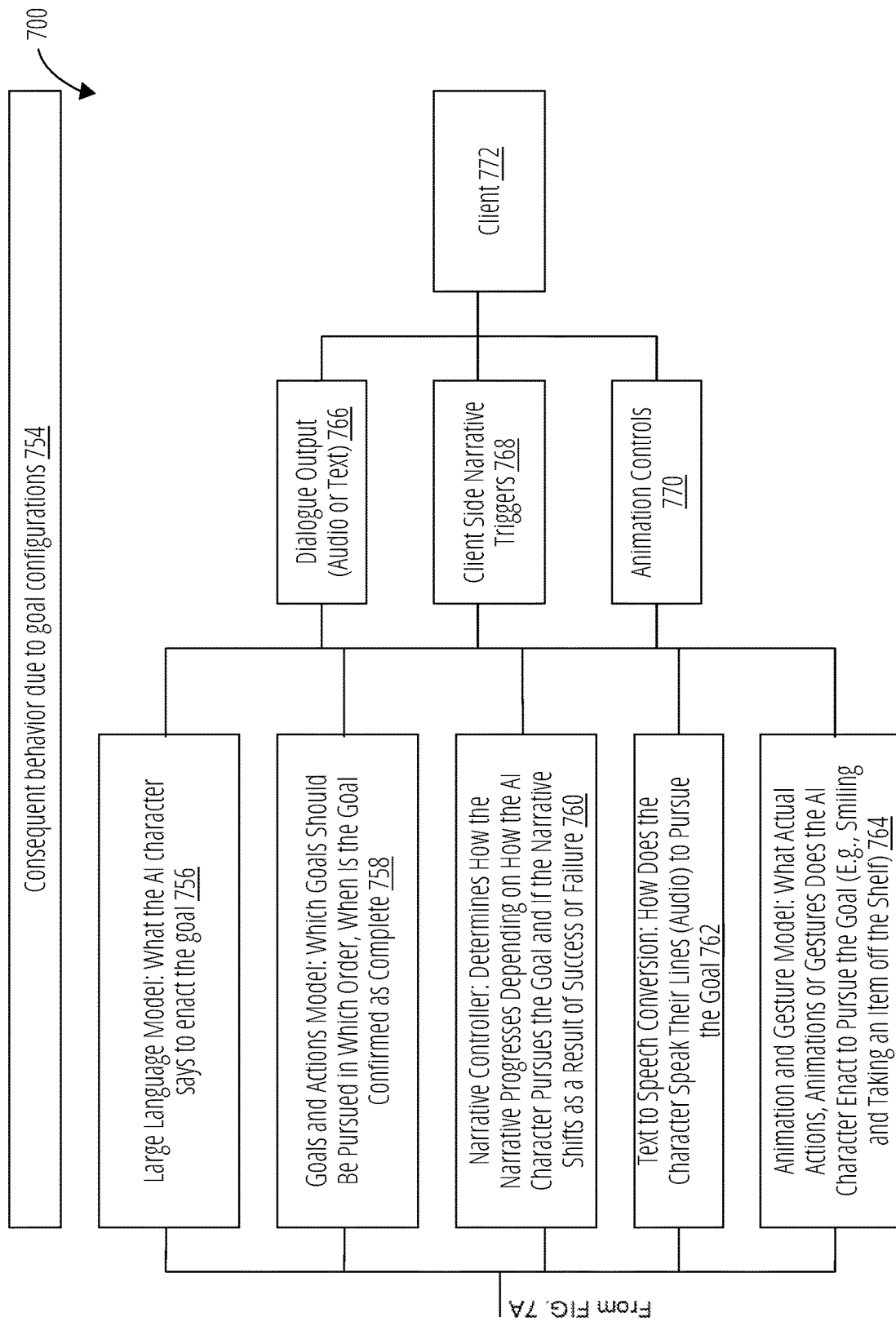
FIG. 7B shows an architecture diagram illustrating AI character models with goal oriented behavior, according to an example embodiment.

FIG. 7A and FIG. 7B show an architecture diagram 700 illustrating AI character models with goal oriented behavior, according to an example embodiment. The AI character models may include generative models configured to follow sequential instructions for dialog and actions that are driven by a specific purpose or intent for AI-driven characters. FIG. 7A shows possible user inputs 702 and input impact for goals model 704. The possible user inputs 702 include fields that are exposed to the user and can be changed by the user in the studio. The input impact for goals model 704 includes impacts of each user input on the goals model.

Compared to general language models that provide general goals for AI characters, the goals model enables providing specific goals. FIG. 7A shows that each type of configuration caused by the possible user inputs 702 may influence the goals and actions of the AI character. More specifically, the AI character personality and background description 706 selected by the user has an impact on the constitution of AI character personality and style, which biases the reason for which, and manner in which, the AI character pursues goals, as shown in block 708. Therefore, the AI character personality and background description 706 may influence how the AI character enacts its goals. For example, if the AI characters are Alice in Wonderland versus Jack Sparrow, the AI characters may have the exact same goal (e.g., to show their house to a player). However, the AI characters may show their houses in completely different ways because the AI characters represent two different people.

The motivations 710 received from the user may structure top-level motivations that underlie the reasoning for all AI character behavior and directions, as shown in block 712. Therefore, the motivations 710 may effectively determine why this AI character is pursuing this goal, i.e., determine the top-level motivation of the AI character. For example, the motivation of Alice in Wonderland is to get home. One of the goals of Alice is to ask the Mad Hatter what he knows about Wonderland. These goals may be determined and provided to the top-level motivation.

Flaws and challenges 714 selected by the user allow establishment of flaws and challenges for the AI character, which may influence, motivate, or hinder goal enactment by the AI character, as shown in block 716.

An identity profile 718 selected by the user may specify elements of an AI character (e.g., role, interests) which may have an influence on how the AI character pursues goals (e.g., a policeman trying to uncover information differently from a salesperson), as shown in block 720. The flaws and challenges 714 and the identity profile 718 are ways of enacting so as to influence the goal more contextually. For example, the AI character is Indiana Jones and his flaw is that he is scared of snakes. The goal of the AI character is to cross a cavern covered in snakes. Therefore, based on the flaw, the AI character may say, "Oh, I'm so scared of snakes," and then achieve the goal. Therefore, the flaws and challenges 714 are used to add a context to the goal oriented behavior of the AI character. The identity profile 718 is used similarly to further contextualize the goal oriented behavior of the AI character. For example, the AI characters may include a police person (a first identity) and a salesperson (a second identity) both trying to uncover information, but the salesperson may do it very differently than the police person.

An emotional profile 722 received from the user may be used to establish an emotional profile of an AI character, such that the emotional profile may influence expression of goals, as shown in block 724. The emotional profile 722 may include the expression. For example, the introvertedness of the AI character may be turned up to make the AI character introverted, in which case if the AI character had to sell something or the AI character had to say something to someone, the AI character may be more nervous than if the AI character was extroverted.

Various parts of memories, such as a personal memory 726, world knowledge 730, and contextual knowledge 734 provide information that may be relevant to the pursuit of a goal. Specifically, the personal memory 726 may be used to provide an AI character with personal memories that may be brought up during the pursuit of a goal, as shown in block 728. For example, if the AI character remembers that the AI character recently was bitten by a dog and the goal is to go in and tie up a dog, the AI character may express fear or angst and say, "Oh, I can do that, but I'm really scared, I had this bad experience." Therefore, changing the behavior of the AI character based on the personal memory 726 makes the behavior more realistic.

The world knowledge 730 may be used to integrate information about the world to contextualize pursuit of the goal, as shown in block 732. The world knowledge 730 may be used to further contextualize the behavior of the AI character. For example, in a specific science fiction world, the AI character knows that all the police are corrupt in an area and working for an evil overlord. Therefore, the AI character may be scared or show more cautious when pursuing an investigation.

The contextual knowledge 734 may be processed to include information about an environment or context to contextualize pursuit of the goal, as shown in block 736. For example, if a volcano has just exploded and the AI character is asked to carry a girl to safety, the AI character may show more hurriedness, and may be forceful to the girl, versus if that was not true, the AI character might pursue the goal differently.

Voice configuration 738 may be used to determine the configuration of voice in real-time, which can allow AI characters to show different expressions when pursuing a goal, as shown in block 740. For example, if the AI character is a fireman who is saving someone, it may be extremely loud in a burning building; therefore, the voice of the AI character may be made loud and forceful. The AI character may pursue the goal differently as compared, for example, the case when the AI character was doing the same actions in a courtroom.

Dialogue style controls 742 may be used to control a dialogue style of an AI character. The dialogue style may influence the manner and style of speech of the AI character, as shown in block 744. For example, the user may set the dialog style to be a modern day New York dialogue style or a Wild West style. In each of the styles, the AI character may use different words. For example, a Wild West bartender may use slang when selling a drink.

Goals and actions 746 received from the user may be processed to specify the goals that an AI character has per scene, and then set up the actions that the AI character has available to pursue the goal, as shown in block 748. Therefore, the goals and actions 746 specify the goals for the scene in which the AI character is currently present, the sequence of goals, and actions that the AI characters have to do to pursue the goals.

Animation triggers and controls 750 may include animations and gestures, which may determine which actual physical movements the AI character can take to pursue the goal, as shown in block 752. For example, the AI character is selling an item and needs to take the item off the shelf and show it to the player when selling.

The input impact for goals model 704 are provided to a plurality of AI models to generate a consequent behavior 754 due to goal configurations, as shown in FIG. 7B. More specifically, the LLM may determine what the AI character needs to say to enact the goal, as shown in block 756. The goals and actions model shown in block 758 is the controller for determining which goals need to be pursued and in which order, when is the goal confirmed as complete, and the like.

The narrative controller determines how the narrative progresses depending on how the AI character pursues the goal (the goal is successful or failed) and if the narrative shifts as a result of a success or a failure, as shown in block 760. For example, in a game, an AI character is supposed to save a girl, but the AI character fails and the girl dies. This failure to complete the goal may change the narrative. The narrative controller may send a trigger to change the behavior of the AI character based on this failure to the game engine.

The text to speech conversion model determines how the AI character speaks his lines (audio) to pursue the goal, as shown in block 762. The parameters to be changed may also include, for example, the dialogue style and voice configuration.

The animation and gesture model may determine what actual actions, animations, or gestures the AI character enacts to pursue the goal (e.g., smiling and taking an item off the shelf, picking up a girl to save her from a burning building), as shown in block 764.

The outputs obtained in blocks 756-764 may include a dialogue output (audio or text) 766, client side narrative triggers 768, and animation controls 770. The dialogue output (audio or text) 766, the client side narrative triggers 768, and the animation controls 770 may be provided to a client 772 (e.g., a client engine, a game engine, a web application, and the like).

Figure 8:
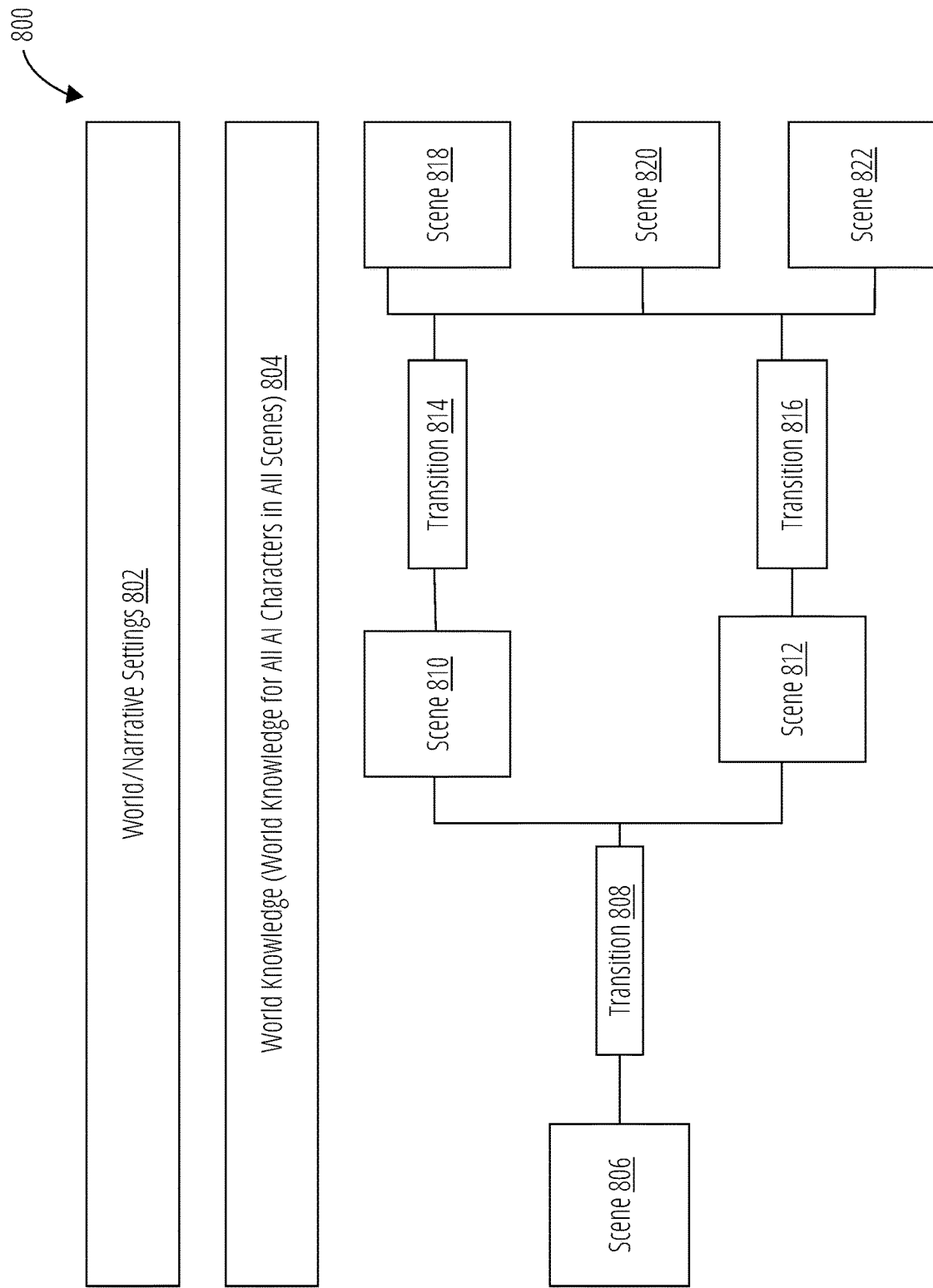
FIG. 8 is a block diagram illustrating a narrative structure that shows a context of scenes used to distinguish context for goals, according to an example embodiment.

FIG. 8 is a block diagram 800 illustrating a narrative structure that shows a context of scenes used to distinguish context for goals, according to an example embodiment. The narrative structure may include world/narrative settings 802 and world knowledge 804 (world knowledge for all AI characters in all scenes). The world/narrative settings 802 and the world knowledge 804 may be used to transition from one scene to another in a story. Therefore, a story or an experience associated with an AI character may happen as a series of scenes and transitions.

In an example embodiment, an AI character may exist in a scene 806. Based on the world/narrative settings 802 and the world knowledge 804, the scene 806 may be transitioned in block 808 into a scene 810 and a scene 812. The scene 810 may be transitioned in block 814 and the scene 812 may be transitioned in block 816 into a scene 818, a scene 820, and a scene 822.

Figure 9:
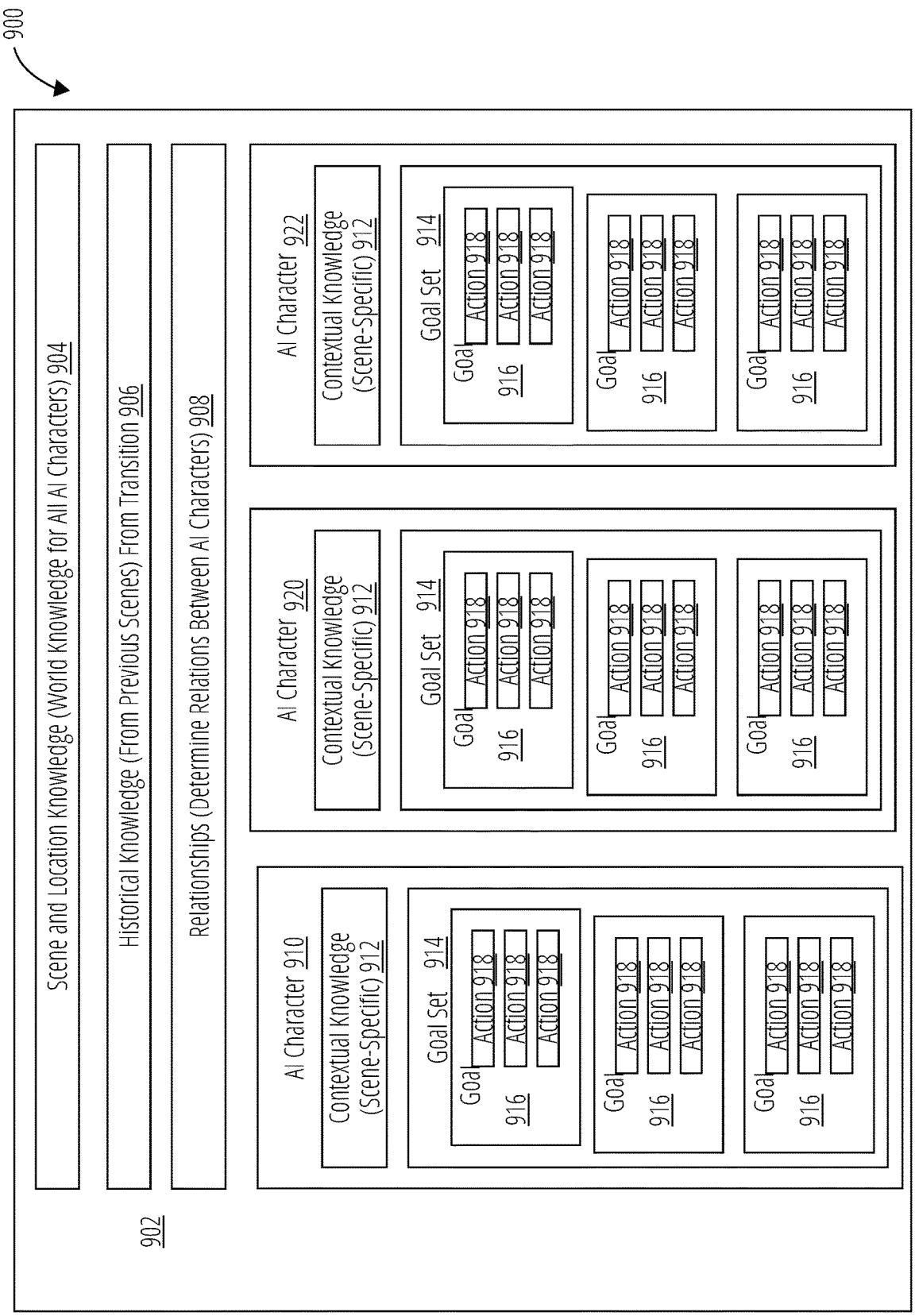
FIG. 9 is a block diagram illustrating a structure of goals within scenes, according to an example embodiment.

FIG. 9 is a block diagram 900 illustrating a structure of goals within scenes, according to an example embodiment. Within each of the scenes, for each specific AI character, there is a goal that the AI character has to pursue. A scene 902 may be driven by a plurality of parameters. The parameters may include scene and location knowledge 904, which may include world knowledge for all AI characters. The parameters may further include historical knowledge 906, which may include knowledge from previous scenes and from transition between the previous scene and the current scene. The parameters may further include relationships 908, which determine relations between AI characters 910, 920, and 922. Each of the AI characters 910, 920, and 922 may have contextual knowledge 912, i.e., scene-specific knowledge. Each of the AI characters 910, 920, and 922 may further have a goal set 914. The goal set 914 may include a plurality of goals 916. Each of the goals 916 may be associated with a plurality of actions 918 to be taken by the AI character to pursue the goals 916.

In an example embodiment, scene 902 is a scene in which the AI character 910 is Indiana Jones who enters a cave (scene and location knowledge 904). The context is as follows: the AI character 910 knows that he is scared of snakes (contextual knowledge 912), but he is running away from enemies (contextual knowledge 912) and the AI character 910 now has the first goal 916 to run through the cave and escape the snakes. Therefore, the AI character 910 has actions 918 available to pursue the goal 916. The actions 918 may include running, asking for help, and the like. The next goal 916 of the AI character 910 may be to find the buried treasure. The last goal 916 may be to escape. For each of those goals 916, the AI character 910 has specific actions 918 that are available for the AI character 910 to pursue.

Figure 10:
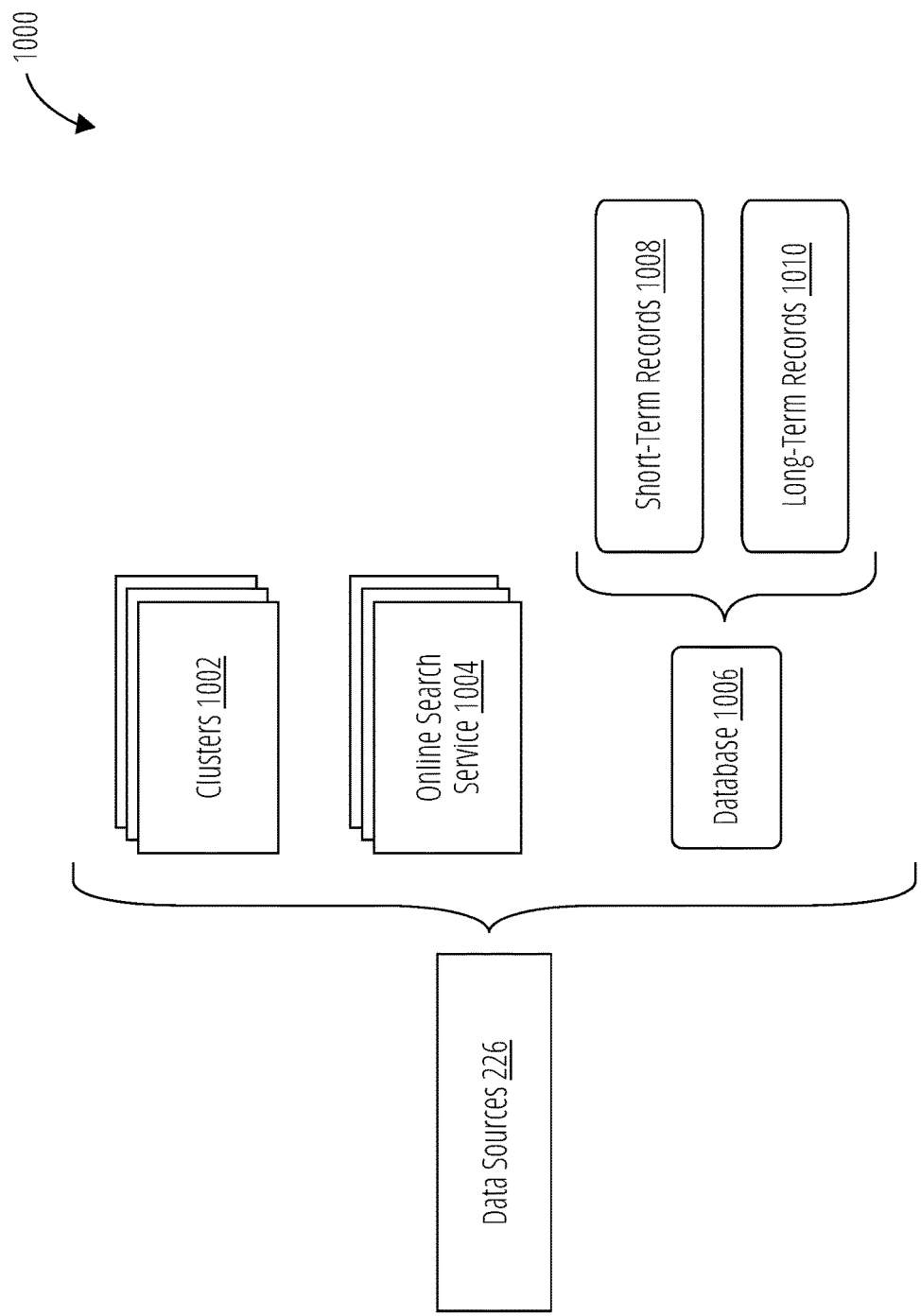
FIG. 10 is a schematic diagram illustrating data sources, according to an example embodiment.

FIG. 10 is a schematic diagram 1000 illustrating data sources 226, according to an example embodiment. Data sources 226 may include a set of clusters 1002, online search services 1004, and a database 1006. The set of clusters 1002 are described further in FIG. 11.

The online search services 1004 may include Internet search engines Google™ search engine, Bing™, Yahoo™ search, and so forth. The online search services 1004 may also include online renewable publications concerning news, public events, sport events, and so forth.

The database 1006 may store short-term records 1008 and long-term records 1010. Both short-term records 1008 and long-term records 1010 may be associated with AI-based characters. The long-term records 1010 may be stored in the database 1006 for a longer time than the short-term records 1008.

Referring back to FIG. 2, the input fields that a user is entering to describe an AI character can be augmented with additional parameters and descriptions hidden from the user. In some embodiments, the discreet terms entered by the user in the input fields, such as words or phrases, can be mapped to hidden prompts describing the personality of the AI character.

Figure 11:
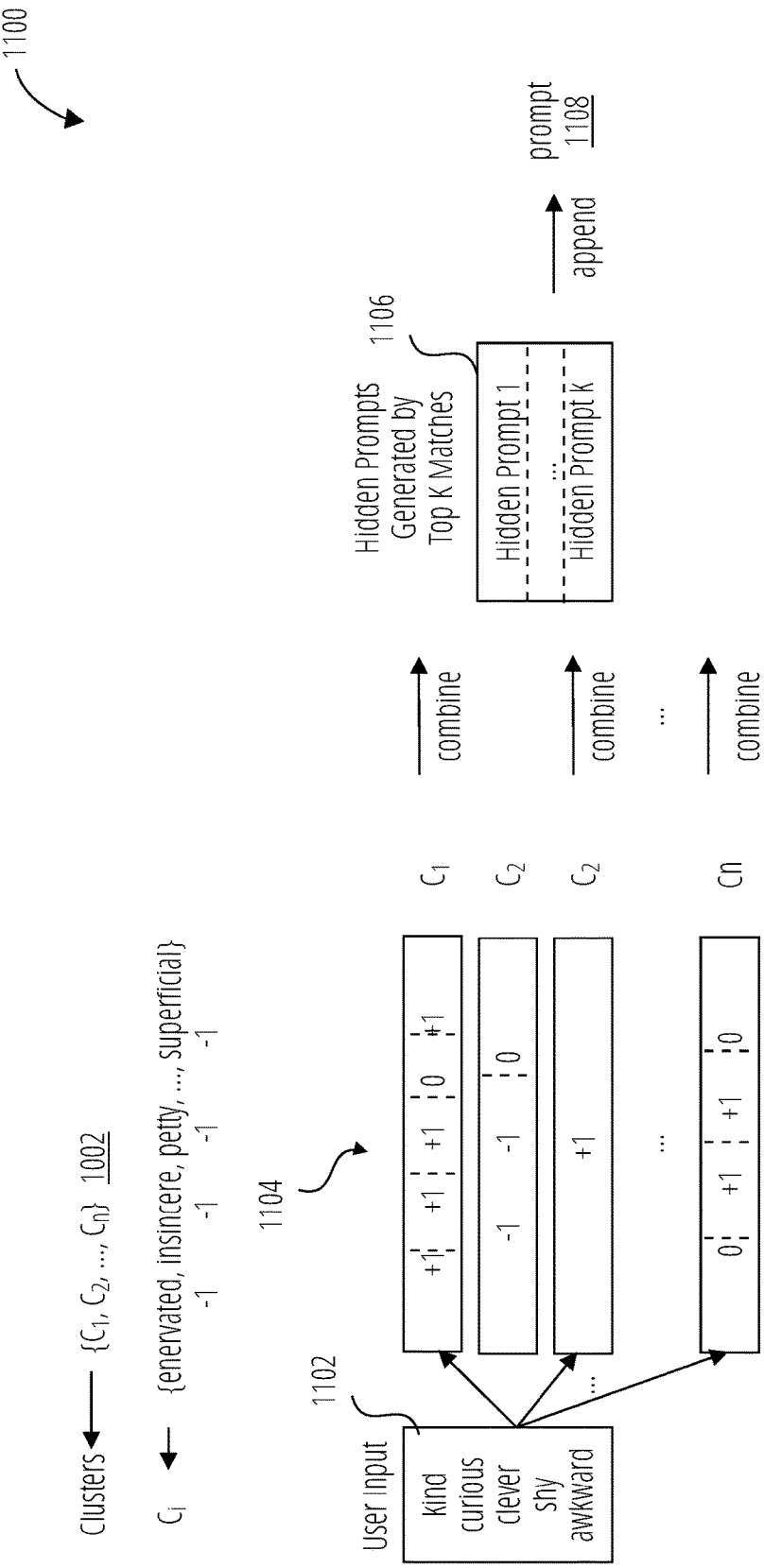
FIG. 11 is a schematic diagram illustrating generation of a prompt for an augmented description of an AI character model, according to an example embodiment.

FIG. 11 shows a schematic diagram 1100 illustrating generation of a prompt for an augmented description of an AI character model, according to an example embodiment. The platform 200 shown in FIG. 2 may receive a user input 1102. The user input 1102 may include keywords (e.g., nouns, verbs, adjectives, and so forth) describing a particular feature of an AI character, for example, voice, personality, dialog style, and so forth. The keywords can be matched to clusters 1002 of characteristics corresponding to this particular feature. For example, if the feature is a personality type, each of the clusters 1002 can be associated with a particular combination of personality types: "moody," "sensitive," "dreary," "enervated," "insincere," "petty," "superficial," and so forth. The user may enter, in the input field for the personality, a keyword, such as "kind," "curious," "clever," "shy," "awkward," and so forth. In various other embodiments, clusters 1002 can also be matched to full sentences or ML matching can be used.

Each of the clusters 1002 can be associated with a hidden prompt (for example, a text string) and/or a parameter (for example, a particular voice setting). A predetermined number of clusters 1104 can be selected based on the keyword entered by the user. For example, top N clusters matched to the keyword provided by the user can be selected. In various other embodiments, matching (also known as selecting) can be direct (keyword based) or ML model based.

The hidden prompts 1106 (text strings) associated with the selected predetermined number of clusters 1104 can be assigned to the character description. In the case of voice or other discrete parameters, the variable settings associated with the selected predetermined number of clusters 1104 can also be assigned to the character description. The hidden prompts 1106 generated by top K matches can be combined into a single prompt 1108. The prompt 1108 can be combined with keywords entered by the user to form an augmented description. Thus, the AI character can be associated with the augmented description or updated settings based on the small number of keywords or description entered by the user.

Even though the schematic diagram 1100 shows a process of obtaining an augmented description for an input field corresponding to the personality of the AI character, it can be used for a variety of input fields, such as voice, dialog style, and so forth.

Figure 12:
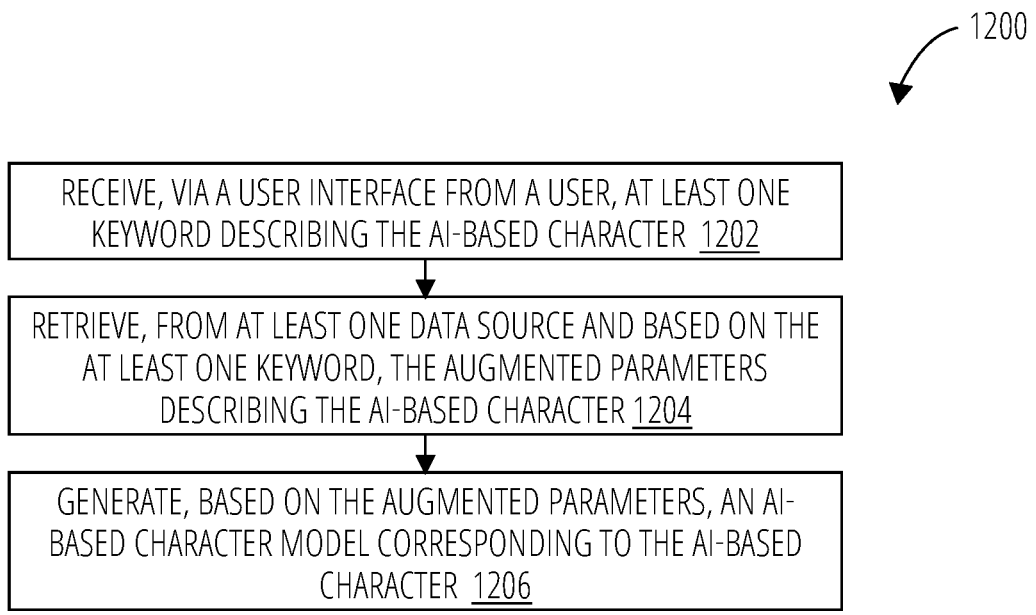
FIG. 12 is a flow chart of a method for retrieval of augmented parameters for an AI-based character, according to an example embodiment.

FIG. 12 is a flow chart of a method 1200 for retrieval of augmented parameters for an AI-based character, according to an example embodiment. In some embodiments, the operations may be combined, performed in parallel, or performed in a different order. The method 1200 may also include additional or fewer operations than those illustrated. The method 1200 may be performed by processing logic that may comprise hardware (e.g., decision making logic, dedicated logic, programmable logic, and microcode), software (such as software run on a general-purpose computer system or a dedicated machine), or a combination of both. In some embodiments, the method 1200 can be implemented by a processor of the computing platform 106.

The method 1200 may commence with receiving, in block 1202, at least one keyword describing the AI-based character. The at least one keyword may be received from a user via a user interface.

The method 1200 may further include retrieving the augmented parameters describing the AI-based character in block 1204. The augmented parameters describing the AI-based character may be retrieved from at least one data source and based on at least one keyword. The at least one data source may include an online search service, e.g., Wikipedia® or Game Wikipedia®. The at least one data source from which the augmented parameters describing the AI-based character may be retrieved may include a set of clusters associated with a type of a feature of the AI-based character and at least one hidden prompt corresponding to the type of the feature.

The method 1200 may proceed with generating an AI-based character model corresponding to the AI-based character in block 1206. The AI-based character model may be generated based on the augmented parameters.

Figure 13:
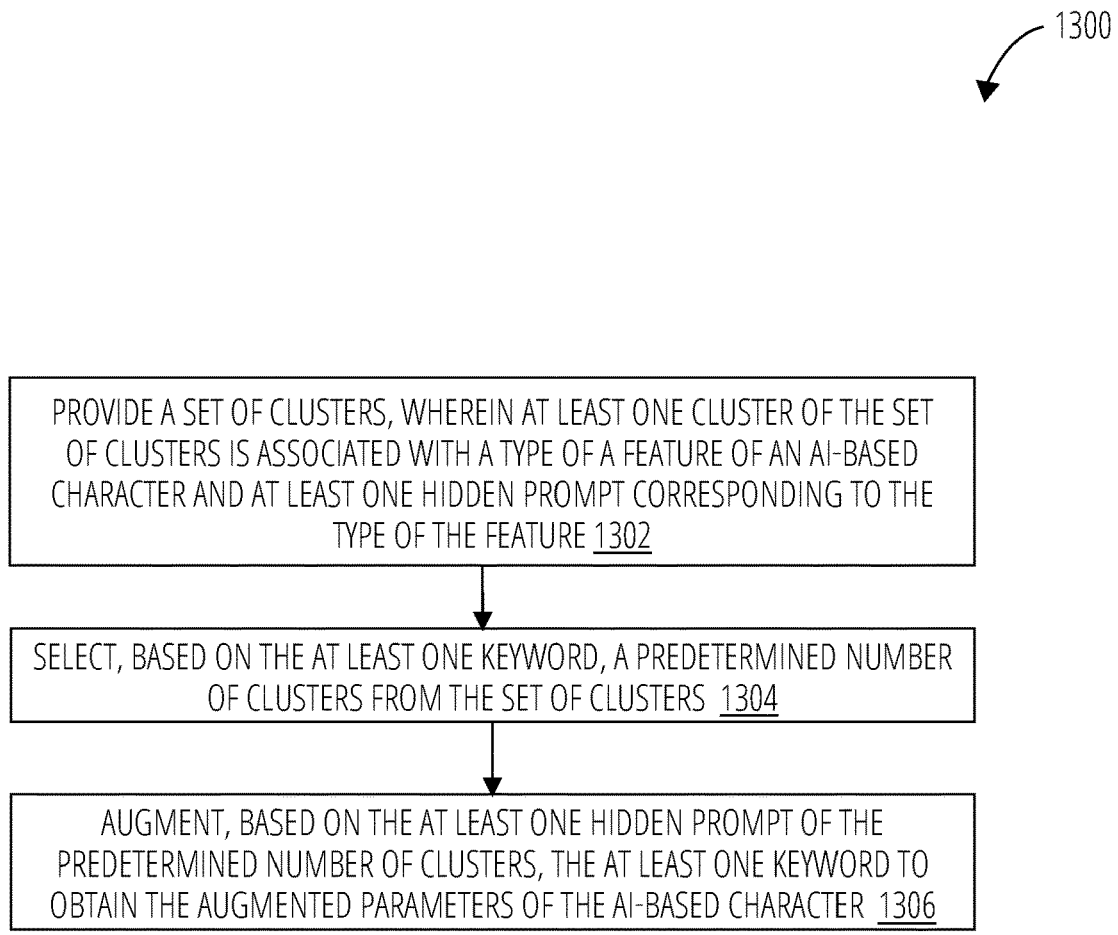
FIG. 13 is a flow chart of a method for retrieval of augmented parameters for an AI-based character, according to an example embodiment.

FIG. 13 shows an example method 1300 for retrieval of augmented parameters for an AI-based character, according to an example embodiment. The method 1300 may provide details of the method 1200 shown in FIG. 12 in embodiments, where at least one data source includes a set of clusters. In some embodiments, the operations may be combined, performed in parallel, or performed in a different order. The method 1300 may also include additional or fewer operations than those illustrated. The method 1300 may be performed by processing logic that may comprise hardware (e.g., decision making logic, dedicated logic, programmable logic, and microcode), software (such as software run on a general-purpose computer system or a dedicated machine), or a combination of both. In some embodiments, the method 1200 can be implemented by a processor of the computing platform 106.

The method 1300 may commence in block 1302 with providing the set of clusters. The set of clusters may be associated with a type of a feature of the AI-based character and at least one hidden prompt corresponding to the type of the feature. The type of the feature may include one of the following: a voice, a dialog style, an emotional state, an age, temperament, and so forth.

In the embodiment where at least one data source includes the set of clusters, the retrieval of the augmented parameters describing the AI-based character may be performed as follows. In block 1304, the method 1300 may include selecting, based on at least one keyword, a predetermined number of clusters from the set of clusters. In block 1306, the method 1300 may proceed with augmenting at least one keyword to obtain the augmented parameters of the AI-based character. The at least one keyword may be augmented based on the at least one hidden prompt associated with the predetermined number of clusters. The at least one hidden prompt may be hidden from the user.

Figure 14:
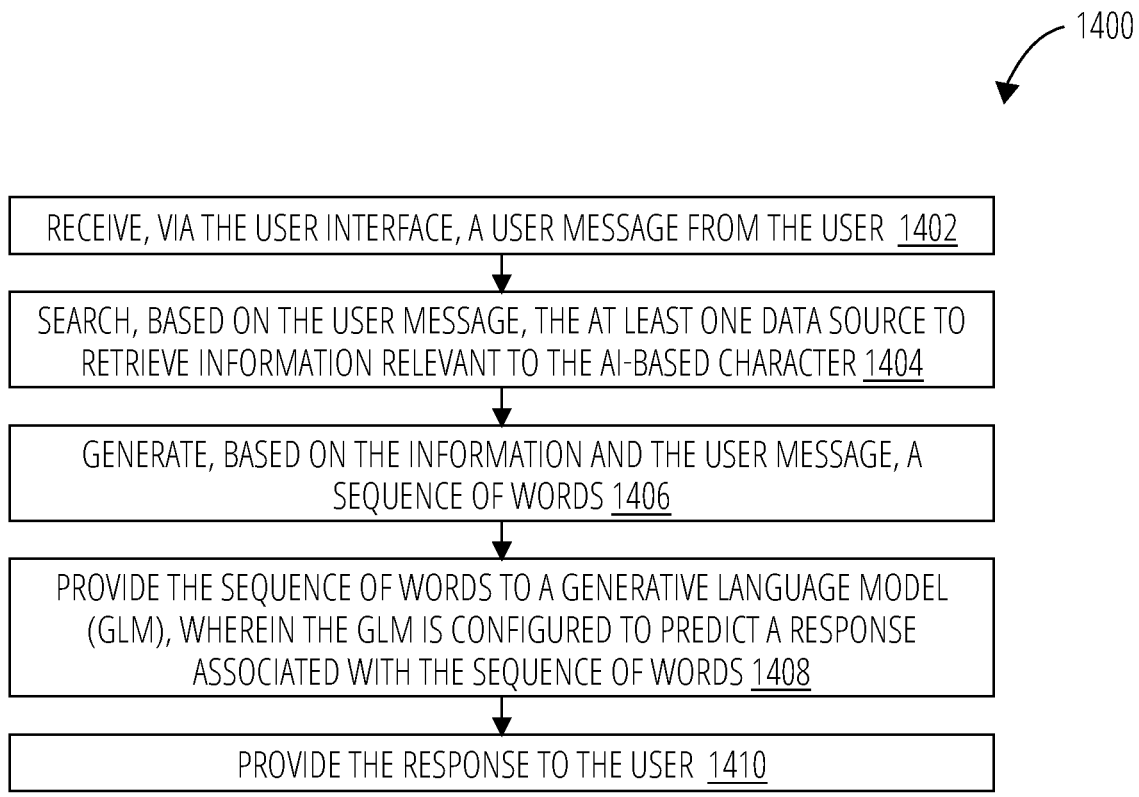
FIG. 14 is a flow chart of a method for interactions of an AI-based character model with a user, according to an example embodiment.

FIG. 14 is a flow chart of a method 1400 for interaction of an AI-based character model with a user, according to an example embodiment. In an example embodiment, the method 1400 may be a continuation of the method 1200 shown in FIG. 12 and/or the method 1300 shown in FIG. 13. In some embodiments, the operations may be combined, performed in parallel, or performed in a different order. The method 1400 may also include additional or fewer operations than those illustrated. The method 1400 may be performed by processing logic that may comprise hardware (e.g., decision making logic, dedicated logic, programmable logic, and microcode), software (such as software run on a general-purpose computer system or a dedicated machine), or a combination of both. In some embodiments, the method 1200 can be implemented by a processor of the computing platform 106.

The method 1400 may commence in block 1402 with receiving a user message from the user via the user interface. The method 1400 may further include searching, based on the user message, at least one data source to retrieve information relevant to the AI-based character model in block 1404. The at least one data source may include a database configured to store records associated with the AI-based character model. The database may include short-term records and long-term records. The long-term records may be stored in the database for a longer time than the short-term records.

The method 1400 may proceed with generating a sequence of words in block 1406. The sequence of words may be generated based on the information and the user message. The method 1400 may further include providing the sequence of words to a GLM in block 1408. The GLM may be configured to predict a response associated with the sequence of words. The method 1400 may proceed with providing the response to the user in block 1410.

The method 1400 may further include storing, at least partially, the response and the user message in the database as a further record associated with the AI-based character model.

The method 1400 may further include receiving a further message from the user. The method 1400 may proceed with determining that the further message substantially matches the user message stored in the database. Upon determining that the further message substantially matches the user message stored in the database, the method 1400 may continue with generating a further response based on the further record stored in the database. The method 1400 may proceed with providing a further response to the user.

Figure 15:
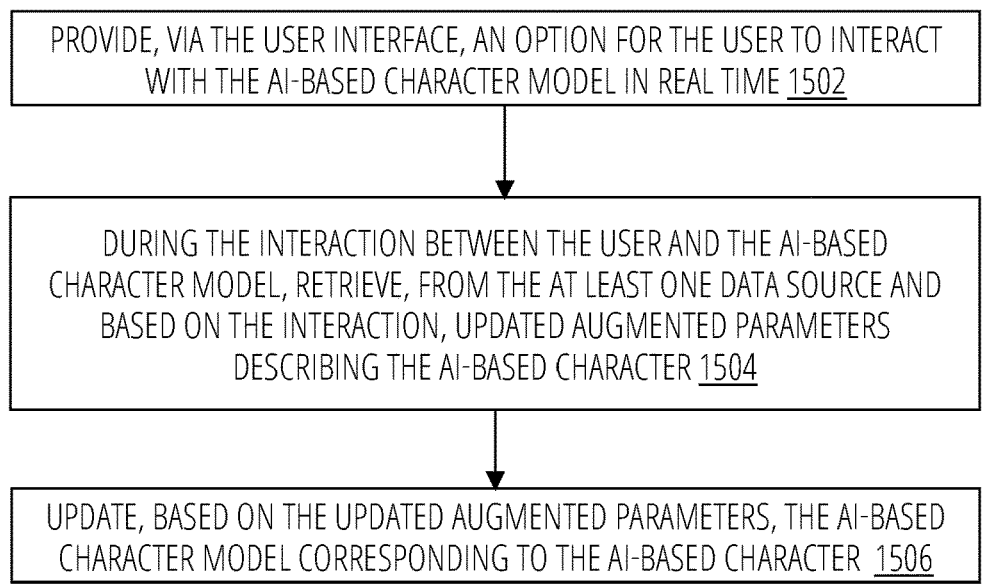
FIG. 15 is a flow chart of a method for retrieval of augmented parameters for an AI-based character, according to an example embodiment.

FIG. 15 is a flow chart of a method 1500 for retrieval of augmented parameters for an AI-based character, according to an example embodiment. In an example embodiment, the method 1500 may be a continuation of the method 1200 shown in FIG. 12, the method 1300 shown in FIG. 13, and/or the method 1400 shown in FIG. 14. In some embodiments, the operations may be combined, performed in parallel, or performed in a different order. The method 1500 may also include additional or fewer operations than those illustrated. The method 1500 may be performed by processing logic that may comprise hardware (e.g., decision making logic, dedicated logic, programmable logic, and microcode), software (such as software run on a general-purpose computer system or a dedicated machine), or a combination of both. In some embodiments, the method 1200 can be implemented by a processor of the computing platform 106.

The method 1500 may commence in block 1502 with providing, via the user interface, an option for the user to interact with the AI-based character model in real time. During an interaction between the user and the AI-based character model, updated augmented parameters describing the AI-based character may be retrieved in block 1504 from at least one data source and based on the interaction between the user and the AI-based character model. Furthermore, during an interaction between the user and the AI-based character model, the AI-based character model corresponding to the AI-based character may be updated in block 1506 based on the updated augmented parameters.

Figure 16:
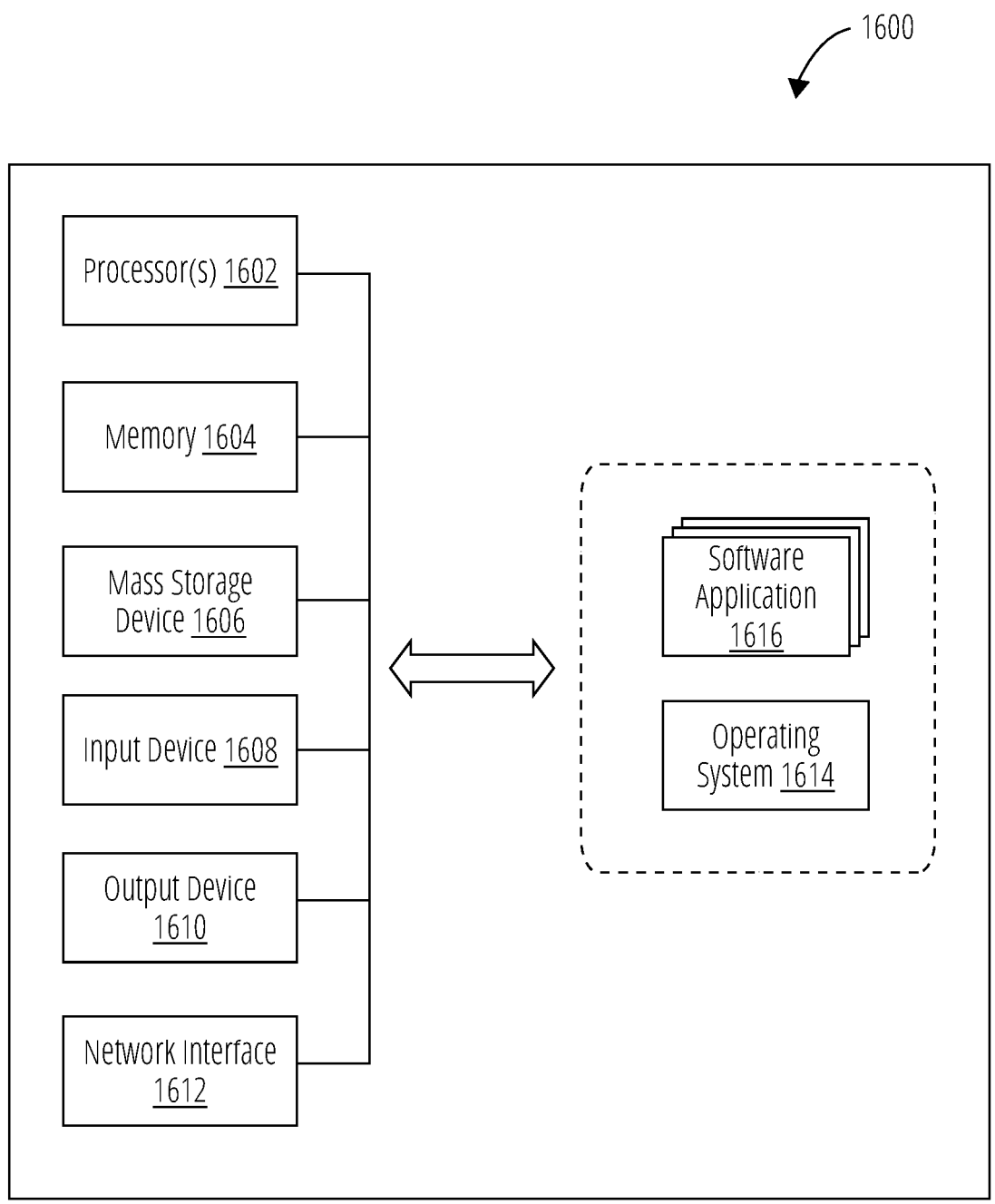
FIG. 16 is a high-level block diagram illustrating an example computer system, within which a set of instructions for causing the machine to perform any one or more of the methodologies discussed herein can be executed.

FIG. 16 is a high-level block diagram illustrating an example computer system 1600, within which a set of instructions for causing the machine to perform any one or more of the methodologies discussed herein can be executed. The computer system 1600 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 1600 is an example of client-side computing device 102 and computing platform 106 shown in FIG. 1. Notably, FIG. 16 illustrates just one example of the computer system 1600 and, in some embodiments, the computer system 1600 may have fewer elements/modules than shown in FIG. 16 or more elements/modules than shown in FIG. 16.

The computer system 1600 may include one or more processor(s) 1602, a memory 1604, one or more mass storage devices 1606, one or more input devices 1608, one or more output devices 1610, and a network interface 1612. The processor(s) 1602 are, in some examples, configured to implement functionality and/or process instructions for execution within the computer system 1600. For example, the processor(s) 1602 may process instructions stored in the memory 1604 and/or instructions stored on the mass storage devices 1606. Such instructions may include components of an operating system 1614 or software applications 1616. The software applications may include the studio 204, the integration interface 206, and the AI character model 202. The computer system 1600 may also include one or more additional components not shown in FIG. 16, such as a housing, a power supply, a battery, a global positioning system (GPS) receiver, and so forth.

The memory 1604, according to one example, is configured to store information within the computer system 1600 during operation. The memory 1604, in some example embodiments, may refer to a non-transitory computer-readable storage medium or a computer-readable storage device. In some examples, the memory 1604 is a temporary memory, meaning that a primary purpose of the memory 1604 may not be long-term storage. The memory 1604 may also refer to a volatile memory, meaning that the memory 1604 does not maintain stored contents when the memory 1604 is not receiving power. Examples of volatile memories include random access memories (RAM), dynamic random access memories (DRAM), static random access memories (SRAM), and other forms of volatile memories known in the art. In some examples, the memory 1604 is used to store program instructions for execution by the processor(s) 1602. The memory 1604, in one example, is used by software (e.g., the operating system 1614 or the software applications 1616). Generally, the software applications 1616 refer to software applications suitable for implementing at least some operations of the methods for retrieval of augmented parameters for an AI-based character as described herein.

The mass storage devices 1606 may include one or more transitory or non-transitory computer-readable storage media and/or computer-readable storage devices. In some embodiments, the mass storage devices 1606 may be configured to store greater amounts of information than the memory 1604. The mass storage devices 1606 may further be configured for long-term storage of information. In some examples, the mass storage devices 1606 include non-volatile storage elements. Examples of such non-volatile storage elements include magnetic hard disks, optical discs, solid-state discs, flash memories, forms of electrically programmable memories (EPROM) or electrically erasable and programmable memories, and other forms of non-volatile memories known in the art.

The input devices 1608, in some examples, may be configured to receive input from a user through tactile, audio, video, or biometric channels. Examples of the input devices 1608 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1600, or components thereof.

The output devices 1610, in some examples, may be configured to provide output to a user through visual or auditory channels. The output devices 1610 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1610 may also include a touchscreen, a presence-sensitive display, or other input/output capable displays known in the art.

The network interface 1612 of the computer system 1600, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi networks®, among others. The network interface 1612 may be a network interface card, such as an Ethernet card, an optical transceiver, a radio frequency transceiver, or any other type of device that can send and receive information.

The operating system 1614 may control one or more functionalities of the computer system 1600 and/or components thereof. For example, the operating system 1614 may interact with the software applications 1616 and may facilitate one or more interactions between the software applications 1616 and components of the computer system 1600. As shown in FIG. 16, the operating system 1614 may interact with or be otherwise coupled to the software applications 1616 and components thereof. In some embodiments, the software applications 1616 may be included in the operating system 1614. In these and other examples, virtual modules, firmware, or software may be part of the software applications 1616.

Thus, systems and methods for retrieval of augmented parameters for an AI-based character have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for retrieval of augmented parameters for an artificial intelligence (AI)-based character, the method comprising:
    receiving, from a user via a user interface, at least one keyword describing the AI-based character;
    retrieving, from at least one data source and based on the at least one keyword, the augmented parameters describing the AI-based character;
    generating, based on the augmented parameters, an AI-based character model corresponding to the AI-based character;
    providing, via the user interface, an option for the user to interact with the AI-based character model in real time in a virtual environment, wherein an interaction between the AI-based character and the user includes at least one verbal response of the AI-based character;
    receiving, from a client-side computing device associated with the user, one or more events associated with the AI-based character and a further AI-based character in the virtual environment;
    providing the one or more events to an integration interface to generate updated augmented parameters describing the AI-based character, wherein the updated augmented parameters include a level of anxiety of the AI-based character with regard to a future appearance of the further AI-based character in the virtual environment; and
    during the interaction between the user and the AI-based character model:
        retrieving, from the at least one data source and based on the interaction, the updated augmented parameters describing the AI-based character; and
        updating, based on the updated augmented parameters, the AI-based character model corresponding to the AI-based character.

2. The method of claim 1, wherein the at least one data source includes an online search service.

3. The method of claim 1, wherein:
    the at least one data source includes a set of clusters associated with a type of a feature of the AI-based character and at least one hidden prompt corresponding to the type of the feature; and
    the retrieving the augmented parameters includes:
        selecting, based on the at least one keyword, a predetermined number of clusters from the set of clusters; and
        augmenting, based on the at least one hidden prompt associated with the predetermined number of clusters, the at least one keyword to obtain the augmented parameters of the AI-based character.

4. The method of claim 3, wherein the type of the feature includes one of the following: a voice, a dialog style, an emotional state, an age, and a temperament.

5. The method of claim 3, wherein the at least one hidden prompt is hidden from the user.

6. The method of claim 1, further comprising:
    receiving a user message from the user via the user interface;
    searching, based on the user message, the at least one data source to retrieve information relevant to the AI-based character;
    generating, based on the information and the user message, a sequence of words;
    providing the sequence of words to a generative language model (GLM), wherein the GLM is configured to predict a response associated with the sequence of words; and
    providing the response to the user.

7. The method of claim 6, wherein the at least one data source includes a database configured to store records associated with the AI-based character.

8. The method of claim 7, further comprising storing, at least partially, the response and the user message in the database as a further record associated with the AI-based character model.

9. The method of claim 8, further comprising:
    receiving a further message from the user;
    determining that the further message substantially matches the user message stored in the database;
    generating a further response based on the further record stored in the database; and
    providing the further response to the user.

10. A computing device comprising:
    a processor; and
    a memory storing instructions that, when executed by the processor, configure the computing device to:
        receive, from a user via a user interface, at least one keyword describing an artificial intelligence (AI)-based character;
        retrieve, from at least one data source and based on the at least one keyword, augmented parameters describing the AI-based character;
        generate, based on the augmented parameters, an AI-based character model corresponding to the AI-based character;
        provide, via the user interface, an option for the user to interact with the AI-based character model in real time in a virtual environment, wherein an interaction between the AI-based character and the user includes at least one verbal response of the AI-based character;

receive, from a client-side computing device associated with the user, one or more events associated with the AI-based character and a further AI-based character in the virtual environment;

provide the one or more events to an integration interface to generate updated augmented parameters describing the AI-based character, wherein the updated augmented parameters include a level of anxiety of the AI-based character with regard to a future appearance of the further AI-based character in the virtual environment; and during the interaction between the user and the AI-based character model:

retrieve, from the at least one data source and based on the interaction, the updated augmented parameters describing the AI-based character; and update, based on the updated augmented parameters, the AI-based character model corresponding to the AI-based character.

11. The computing device of claim 10, wherein the at least one data source includes an online search service.

12. The computing device of claim 10, wherein:

the at least one data source includes a set of clusters associated with a type of a feature of the AI-based character and at least one hidden prompt corresponding to the type of the feature; and the retrieving the augmented parameters includes:

selecting, based on the at least one keyword, a predetermined number of clusters from the set of clusters; and augmenting, based on the at least one hidden prompt associated with the predetermined number of clusters, the at least one keyword to obtain the augmented parameters of the AI-based character.

13. The computing device of claim 12, wherein the type of the feature includes one of the following: a voice, a dialog style, an emotional state, an age, and a temperament.

14. The computing device of claim 12, wherein the at least one hidden prompt is hidden from the user.

15. The computing device of claim 10, wherein the instructions further configure the computing device to:

receive a user message from the user via the user interface;

search, based on the user message, the at least one data source to retrieve information relevant to the AI-based character;

generate, based on the information and the user message, a sequence of words;

provide the sequence of words to a generative language model (GLM), wherein the GLM is configured to predict a response associated with the sequence of words; and provide the response to the user.

16. The computing device of claim 15, wherein the at least one data source includes a database configured to store records associated with the AI-based character.

17. The computing device of claim 16, wherein the instructions further configure the computing device to store, at least partially, the response and the user message in the database as a further record associated with the AI-based character model.

18. The computing device of claim 17, wherein the instructions further configure the computing device to:

receive a further message from the user;

determine that the further message substantially matches the user message stored in the database;

generate a further response based on the further record stored in the database; and provide the further response to the user.

19. A non-transitory computer-readable storage medium, the computer-readable storage medium including instructions that, when executed by a computing device, cause the computing device to:

receive, from a user via a user interface, at least one keyword describing an artificial intelligence (AI)-based character;

retrieve, from at least one data source and based on the at least one keyword, augmented parameters describing the AI-based character;

generate, based on the augmented parameters, an AI-based character model corresponding to the AI-based character;

provide, via the user interface, an option for the user to interact with the AI-based character model in real time in a virtual environment, wherein an interaction between the AI-based character and the user includes at least one verbal response of the AI-based character;

receive, from a client-side computing device associated with the user, one or more events associated with the AI-based character and a further AI-based character in the virtual environment;

provide the one or more events to an integration interface to generate updated augmented parameters describing the AI-based character, wherein the updated augmented parameters include a level of anxiety of the AI-based character with regard to a future appearance of the further AI-based character in the virtual environment; and during the interaction between the user and the AI-based character model:

retrieve, from the at least one data source and based on the interaction, the updated augmented parameters describing the AI-based character; and update, based on the updated augmented parameters, the AI-based character model corresponding to the AI-based character.

* * * * *